United States Patent
Ogata et al.

(10) Patent No.: US 9,280,828 B2
(45) Date of Patent: Mar. 8, 2016

(54) IMAGE PROCESSING APPARATUS, IMAGE PROCESSING METHOD, AND PROGRAM

(75) Inventors: Masami Ogata, Kanagawa (JP); Takafumi Morifuji, Tokyo (JP); Suguru Ushiki, Tokyo (JP)

(73) Assignee: Sony Corporation, Tokyo (JP)

(*) Notice: Subject to any disclaimer, the term of this patent is extended or adjusted under 35 U.S.C. 154(b) by 582 days.

(21) Appl. No.: 13/482,571

(22) Filed: May 29, 2012

(65) Prior Publication Data
US 2012/0308119 A1  Dec. 6, 2012

(30) Foreign Application Priority Data

Jun. 6, 2011  (JP) .................... 2011-126403

(51) Int. Cl.
 *G06K 9/00* (2006.01)
 *G06T 7/00* (2006.01)
 *H04N 13/00* (2006.01)

(52) U.S. Cl.
 CPC ..... *G06T 7/0075* (2013.01); *G06T 2207/10012* (2013.01); *H04N 2013/0081* (2013.01)

(58) Field of Classification Search
 None
 See application file for complete search history.

(56) References Cited

U.S. PATENT DOCUMENTS

| | | | |
|---|---|---|---|
| 2003/0026474 A1* | 2/2003 | Yano | 382/154 |
| 2009/0196492 A1* | 8/2009 | Jung et al. | 382/154 |
| 2011/0249886 A1* | 10/2011 | Park et al. | 382/154 |
| 2012/0087570 A1* | 4/2012 | Seo et al. | 382/154 |

FOREIGN PATENT DOCUMENTS

| | | |
|---|---|---|
| JP | 2007-208399 | 8/2007 |
| JP | 2009-008539 | 1/2009 |

* cited by examiner

*Primary Examiner* — Nirav G Patel
*Assistant Examiner* — Amandeep Saini
(74) *Attorney, Agent, or Firm* — Paratus Law Group, PLLC

(57) ABSTRACT

A parallax detection unit generates a parallax map indicating a parallax of each pixel of an image formed by right and left images and generates a reliability map indicating reliability of the parallax. A depth information estimation unit generates a depth information map indicating the depth of a subject on the image based on the right and left images. A depth parallax conversion unit converts the depth information map into a pseudo-parallax map using a conversion equation used to convert depth information to parallax information. A parallax synthesis unit synthesizes the parallax map and the pseudo-parallax map to generate a corrected parallax map based on the reliability map. The present technology is applicable to an image processing apparatus.

12 Claims, 18 Drawing Sheets

IMAGE PROCESSING APPARATUS, IMAGE PROCESSING METHOD, AND PROGRAM

The present technology relates to an image processing apparatus, an image processing method, and a program, and more particularly, to an image processing apparatus, an image processing method, and a program capable of detecting a parallax of a stereoscopic image formed by right and left images more accurately.

BACKGROUND

A parallax obtained from a stereoscopic image formed by right and left images corresponds to a depth from a user who views the stereoscopic image to a subject. Therefore, parallax detection of a stereoscopic image can be applied to various kinds of application software such as parallax adjustment or viewpoint synthesis of a stereoscopic image and a three-dimensional interface. The parallax detection of a stereoscopic image is associated with a problem of detecting corresponding points in right and left images (for example, see Japanese Unexamined Patent Application Publication No. 2009-008539).

SUMMARY

However, when there are a plurality of candidates for a reliable corresponding point on one image of a stereoscopic image with respect to a point on the other image of a stereoscopic image, such as when there is a flat or repetitively patterned portion on the image, it is difficult to match the points accurately, and thus the parallax may not be detected with high accuracy.

For example, when the side planes of an object on an image or a plurality of objects overlap each other in a depth direction, the region of a specific subject is present only in one image of the stereoscopic image and the parallax is rarely detected by a method of detecting the corresponding points in the region.

It is desirable to provide an image processing apparatus, an image processing method, and a program capable of detecting a parallax of a stereoscopic image more accurately.

According to an embodiment of the present technology, there is provided an image processing apparatus including: a parallax map generation unit that generates a parallax map indicating a parallax of each pixel of a stereoscopic image based on right and left images forming the stereoscopic image; a reliability calculation unit that generates a reliability map indicating reliability of the parallax map based on the right and left images; a depth information estimation unit that generates a depth information map indicating a depth of a subject on the stereoscopic image based on one of the right and left images; a depth parallax conversion unit that converts the depth information map into a pseudo-parallax map indicating a parallax corresponding to the depth; and a parallax synthesis unit that synthesizes the parallax map and the pseudo-parallax map to generate a corrected parallax map based on the reliability map.

The parallax synthesis unit may generate the corrected parallax map by adding the parallax map and the pseudo-parallax map in a weighted manner using a weight determined by the reliability map.

The parallax synthesis unit may include a component synthesis unit that synthesizes a high-pass component of the pseudo-parallax map and a low-pass component of the parallax map to generate a synthesized map; and an adding unit that synthesizes the parallax map and the synthesized map to generate the corrected parallax map based on the reliability map.

The parallax synthesis unit may include a component synthesis unit that synthesizes a low-pass component of the pseudo-parallax map and a high-pass component of the parallax map to generate a synthesized map; and an adding unit that synthesizes the parallax map and the synthesized map to generate the corrected parallax map based on the reliability map.

The image processing apparatus may further include a residual map generation unit that generates a residual map indicating a residual between a region near a predetermined pixel of one of the right and left images and a region near a corresponding pixel of the other image which corresponds to the predetermined pixel. The reliability calculation unit may generate the reliability map based on the residual map.

The parallax map generation unit may generate the parallax map by detecting, as a pixel corresponding to a predetermined pixel of one of the right and left images, a pixel of the other image for which a residual between a region near the predetermined pixel of the one image and a region near a pixel of the other image is minimum. The image processing apparatus may further include a peak sharpness map generation unit that generates a peak sharpness map that indicates sharpness of a peak of the residual of the pixels lined up in a predetermined direction on the other image and is used for generating the reliability map.

The image processing apparatus may further include a matching degree calculation unit that generates a matching degree map indicating a matching degree between a predetermined pixel of one of the right and left images and a first corresponding pixel of the other image corresponding to the predetermined pixel based on a detection result of the first corresponding pixel of the other image and a detection result of a second corresponding pixel of the one image corresponding to the first corresponding pixel of the other image. The reliability calculation unit may generate the reliability map based on the matching degree map.

According to another embodiment of the present technology, there is provided an image processing method or a program that includes generating a parallax map indicating a parallax of each pixel of a stereoscopic image based on right and left images forming the stereoscopic image; generating a reliability map indicating reliability of the parallax map based on the right and left images; generating a depth information map indicating a depth of a subject on the stereoscopic image based on one of the right and left images; and converting the depth information map into a pseudo-parallax map indicating a parallax corresponding to the depth and synthesizing the parallax map and the pseudo-parallax map to generate a corrected parallax map based on the reliability map.

According to still another embodiment of the present technology, a parallax map indicating a parallax of each pixel of a stereoscopic image is generated based on right and left images forming the stereoscopic image; a reliability map indicating reliability of the parallax map is generated based on the right and left images; a depth information map indicating a depth of a subject on the stereoscopic image is generated based on one of the right and left images; and the depth information map is converted into a pseudo-parallax map indicating a parallax corresponding to the depth, and the parallax map and the pseudo-parallax map are synthesized to generate a corrected parallax map based on the reliability map.

According to still another embodiment of the present technology, there is provided an image processing apparatus including: a depth information estimation unit that generates a depth information map indicating a depth of a subject on a stereoscopic image based on one of right and left images forming the stereoscopic image; a depth parallax conversion unit that converts the depth information map into a pseudo-parallax map indicating a parallax corresponding to the depth; and a parallax map generation unit that generates a parallax map indicating the parallax of each pixel of the stereoscopic image based on the right and left images and the pseudo-parallax map.

According to still another embodiment of the present technology, there is provided an image processing method or a program that includes generating a depth information map indicating a depth of a subject on a stereoscopic image based on one of right and left images forming the stereoscopic image; and converting the depth information map into a pseudo-parallax map indicating a parallax corresponding to the depth and generating a parallax map indicating the parallax of each pixel of the stereoscopic image based on the right and left images and the pseudo-parallax map.

According to still another embodiment of the present technology, a depth information map indicating a depth of a subject on a stereoscopic image is generated based on one of right and left images forming the stereoscopic image, the depth information map is converted into a pseudo-parallax map indicating a parallax corresponding to the depth, and a parallax map indicating the parallax of each pixel of the stereoscopic image is generated based on the right and left images and the pseudo-parallax map.

According to the embodiments of the present technology described above, the parallax of a stereoscopic image can be detected more accurately.

DETAILED DESCRIPTION OF THE EMBODIMENT

Figure 1:
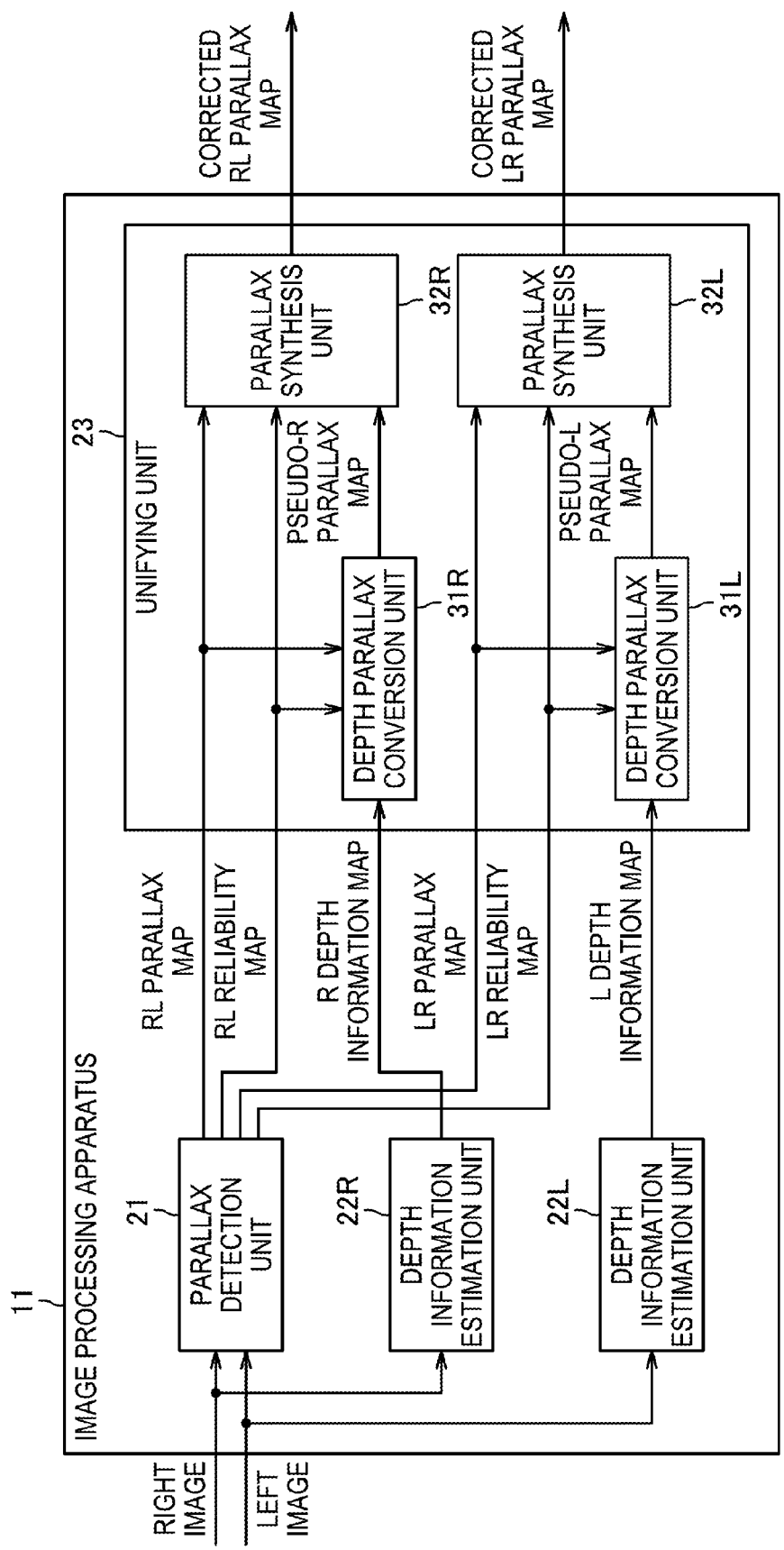
FIG. 1 is a diagram illustrating an example of the configuration of an image processing apparatus according to an embodiment.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

First Embodiment

Example of Configuration of Image Processing Apparatus

FIG. 1 is a diagram illustrating an example of the configuration of an image processing apparatus according to an embodiment of the present technology.

When a stereoscopic image formed by right and left images is supplied, an image processing apparatus 11 detects a parallax of the stereoscopic image and outputs the detection result. Here, the right image refers to an image that is displayed so as to be viewed with the right eye of a user when the stereoscopic image is displayed. The left image refers to an image that is displayed so as to be viewed with the left eye of the user when the stereoscopic image is displayed.

The image processing apparatus 11 includes a parallax detection unit 21, a depth information estimation unit 22R, a depth information estimation unit 22L, and a unifying unit 23.

Based on the supplied right and left images, the parallax detection unit 21 generates a parallax map indicating a parallax in each pixel of the stereoscopic image and a reliability map indicating the certainty, that is, the reliability, of the parallax of each pixel expressed by the parallax map, and then supplies the parallax map and the reliability map to the unifying unit 23.

Hereinafter, a parallax map formed with reference to the right image, that is, a parallax map indicating a parallax between each pixel of the right image and each pixel of the left image which corresponds to each pixel of the right image is referred to as an RL parallax map. A parallax map formed with reference to the left image is referred to as an LR parallax map. Further, a reliability map indicating the reliability of the RL parallax map is referred to as an RL reliability map and a reliability map indicating the reliability of the LR parallax map is referred to as an LR reliability map.

Based on the supplied right image, the depth information estimation unit 22R generates an R depth information map indicating the depth of each region (subject) on the right image, and then supplies the R depth information map to the unifying unit 23. Based on the supplied left image, the depth information estimation unit 22L generates an L depth information map indicating the depth of each region of the left image, and then supplies the L depth information map to the unifying unit 23.

Here, the depth of a subject on an image refers to the relative depth position of a subject estimated to be perceived by the user viewing the image. When it is not necessary to particularly distinguish between the depth information estimation unit 22R and the depth information estimation unit 22L, the depth information estimation unit 22R and the depth information estimation unit 22L are simply referred to as the depth information estimation units 22 below. Further, when it is not necessary to particularly distinguish between the R depth information map and the L depth information map, the R depth information map and the L depth information map are simply referred to as the depth information maps below.

Based on the reliability map from the parallax detection unit 21, the unifying unit 23 unifies the parallax map from the parallax detection unit 21 and the depth information maps from the depth information estimation units 22 to generate a corrected parallax map. In other words, the parallax map is corrected using the depth information maps in accordance with the reliability map.

The unifying unit 23 includes a depth parallax conversion unit 31R, a depth parallax conversion unit 31L, a parallax synthesis unit 32R, and a parallax synthesis unit 32L.

The depth parallax conversion unit 31R converts the R depth information map from the depth information estimation unit 22R into an R pseudo-parallax map having parallax information based on the RL parallax map and the RL reliability map supplied from the parallax detection unit 21, and then supplies the R pseudo-parallax map to the parallax synthesis unit 32R. That is, the R depth information map indicating the depth is converted to the R pseudo-parallax map indicating the parallax corresponding to the depth.

The parallax synthesis unit 32R synthesizes the RL parallax map from the parallax detection unit 21 and the R pseudo-parallax map from the depth parallax conversion unit 31R based on the RL reliability map supplied from the parallax detection unit 21, generates a corrected RL parallax map, and then outputs the corrected RL parallax map.

The depth parallax conversion unit 31L converts the L depth information map from the depth information estimation unit 22L into an L pseudo-parallax map having parallax information based on the LR parallax map and the LR reliability map supplied from the parallax detection unit 21, and then supplies the L pseudo-parallax map to the parallax synthesis unit 32L. The parallax synthesis unit 32L synthesizes the LR parallax map from the parallax detection unit 21 and the L pseudo-parallax map from the depth parallax conversion unit 31L based on the LR reliability map supplied from the parallax detection unit 21, generates a corrected LR parallax map, and then outputs the corrected RL parallax map.

When it is not necessary to particularly distinguish between the depth parallax conversion unit 31R and the depth parallax conversion unit 31L, the depth parallax conversion unit 31R and the depth parallax conversion unit 31L are simply referred to as the depth parallax conversion units 31 below. Further, when it is not necessary to particularly distinguish between the parallax synthesis unit 32R and the parallax synthesis unit 32L, the parallax synthesis unit 32R and the parallax synthesis unit 32L are simply referred to as the parallax synthesis units 32 below.

When it is not necessary to particularly distinguish between the R pseudo-parallax map and the L pseudo-parallax map, the R pseudo-parallax map and the L pseudo-parallax map are simply referred to as the pseudo-parallax maps below. Further, when it is not necessary to particularly distinguish between the corrected RL parallax map and the corrected LR parallax map, the corrected RL parallax map and the corrected LR parallax map are simply referred to as the corrected parallax maps below.

Example of Configuration of Parallax Detection Unit

Figure 2:
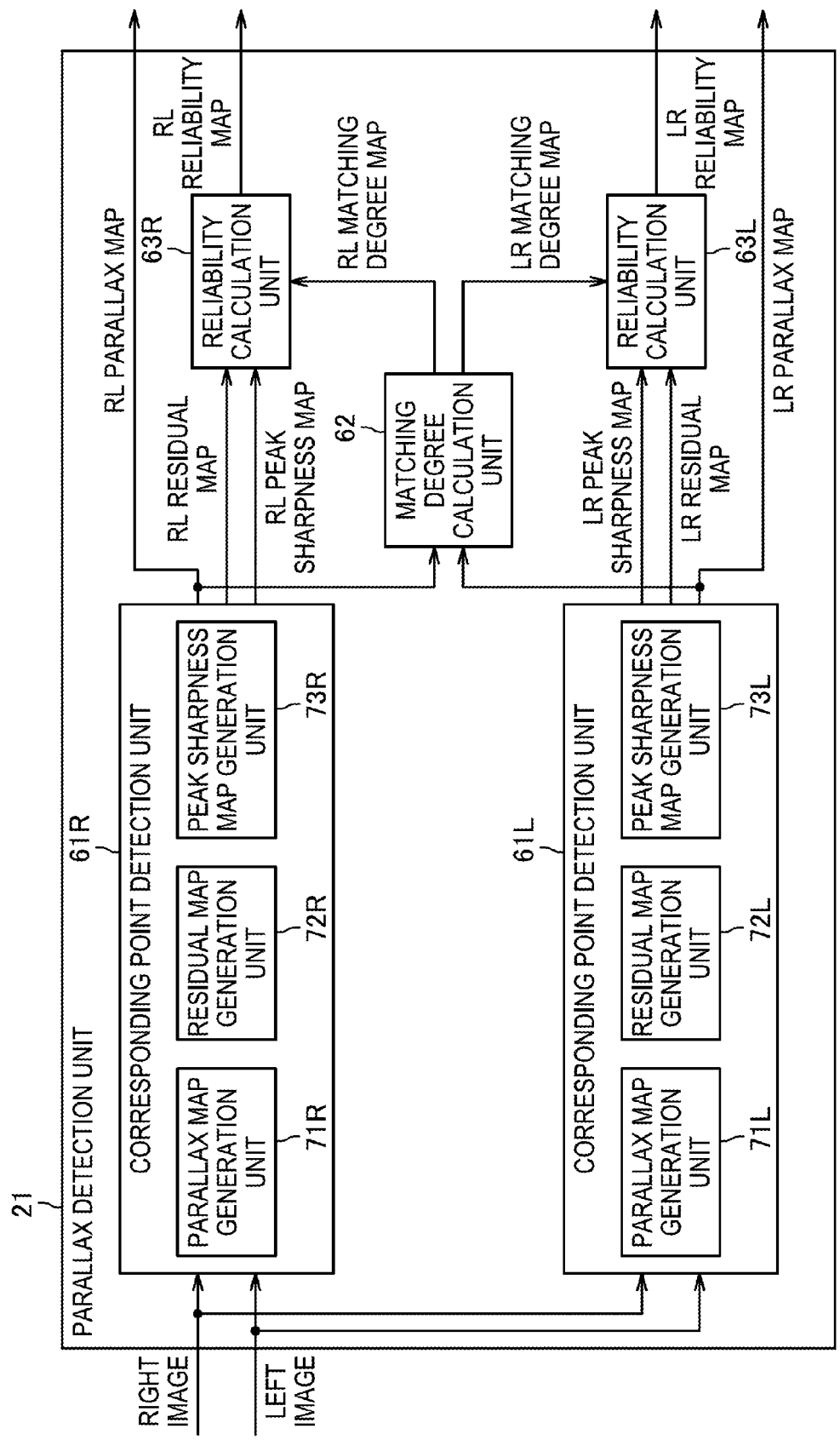
FIG. 2 is a diagram illustrating an example of the configuration of a parallax detection unit.

FIG. 2 shows the detailed configuration of the parallax detection unit 21 in FIG. 1.

That is, the parallax detection unit 21 includes a corresponding point detection unit 61R, a corresponding point detection unit 61L, a matching degree calculation unit 62, a reliability calculation unit 63R, and a reliability calculation unit 63L.

The corresponding point detection unit 61R detects the pixels corresponding to the pixels of the right image from the left image and generates the RL parallax map, an RL residual map, and an RL peak sharpness map. The corresponding point detection unit 61R includes a parallax map generation unit 71R, a residual map generation unit 72R, and a peak sharpness map generation unit 73R.

The parallax map generation unit 71R generates the RL parallax map based on the supplied right and left images, and then supplies the RL parallax map to the matching degree calculation unit 62, the depth parallax conversion unit 31R, and the parallax synthesis unit 32R. That is, the pixels of the left image which respectively correspond to the pixels of the right image are detected and the RL parallax map is generated based on the positions of these pixels. Hereinafter, the pixels of one of the right and left images which correspond to the pixel of the other image are referred to as corresponding pixels. For example, the corresponding pixels of the left image which correspond to predetermined pixels of the right image are pixels used to show the same subject as that of the predetermined pixel of the right image.

The residual map generation unit 72R generates an RL residual map, which indicates a residual between a region near the pixels of the right image and a region near the corresponding pixels of the left image which correspond to the pixels of the right image, based on the right and left images and the detection result of the corresponding pixels obtained by the parallax map generation unit 71R, and then supplies the RL residual map to the reliability calculation unit 63R.

The peak sharpness map generation unit 73R generates the sharpness of a peak of a curve indicating the residual between each pixel of the right image and each pixel of the left image, that is, an RL peak sharpness map indicating the degree of dispersion of the residual, based on the supplied right and left images, and then supplies the RL peak sharpness map to the reliability calculation unit 63R.

The corresponding point detection unit 61L detects the corresponding pixels of the right image with respect to the pixels of the left image and generates the LR parallax map, an LR residual map, and an LR peak sharpness map. The corresponding point detection unit 61L includes a parallax map generation unit 71L, a residual map generation unit 72L, and a peak sharpness map generation unit 73L.

The parallax map generation unit 71L, the residual map generation unit 72L, and the peak sharpness map generation unit 73L perform the same processes as the parallax map generation unit 71R, the residual map generation unit 72R, and the peak sharpness map generation unit 73R, respectively, and thus the description thereof will not be repeated. The parallax map generation unit 71L, the residual map generation unit 72L, and the peak sharpness map generation unit 73L of the corresponding point detection unit 61L generate the LR parallax map, the LR residual map, and the LR peak sharpness map, respectively.

When it is not necessary to particularly distinguish between the corresponding point detection unit 61R and the corresponding point detection unit 61L, the corresponding point detection unit 61R and the corresponding point detection unit 61L are simply referred to as the corresponding point detection units 61 below. When it is not necessary to particularly distinguish between the parallax map generation unit 71R and the parallax map generation unit 71L, the parallax map generation unit 71R and the parallax map generation unit 71L are simply referred to as the parallax map generation units 71 below. When it is not necessary to particularly distinguish between the residual map generation unit 72R and the residual map generation unit 72L, the residual map generation unit 72R and the residual map generation unit 72L are simply referred to as the residual map generation units 72 below. When it is not necessary to particularly distinguish between the peak sharpness map generation unit 73R and the peak sharpness map generation unit 73L, the peak sharpness map generation unit 73R and the peak sharpness map generation unit 73L are simply referred to as the peak sharpness map generation units 73 below.

When it is not necessary to particularly distinguish between the RL residual map and the LR residual map, the RL residual map and the LR residual map are simply referred to as the residual maps below. When it is not necessary to particularly distinguish between the RL peak sharpness map and the LR peak sharpness map, the RL peak sharpness map and the LR peak sharpness map are simply referred to as the peak sharpness maps below.

The matching degree calculation unit 62 generates matching degree maps indicating the matching degree between the parallax maps based on the RL parallax map from the corresponding point detection unit 61R and the LR parallax map from the corresponding point detection unit 61L. That is, the matching degree calculation unit 62 generates an RL matching degree map indicating the matching degree of the RL parallax map to the LR parallax map, and then supplies the RL matching degree map to the reliability calculation unit 63R. Further, the matching degree calculation unit 62 generates an LR matching degree map indicating the matching degree of the LR parallax map to the RL parallax map, and then supplies the LR matching degree map to the reliability calculation unit 63L.

When it is not necessary to particularly distinguish between the RL matching degree map and the LR matching degree map, the RL matching degree map and the LR matching degree map are simply referred to as the matching degree maps below.

The reliability calculation unit 63R generates the RL reliability map based on the RL residual map and the RL peak sharpness map from the corresponding point detection unit 61R and the RL matching degree map from the matching degree calculation unit 62, and then supplies the RL reliability map to the depth parallax conversion unit 31R and the parallax synthesis unit 32R.

The reliability calculation unit 63L generates the LR reliability map based on the LR residual map and the LR peak sharpness map from the corresponding point detection unit 61L and the LR matching degree map from the matching degree calculation unit 62, and then supplies the LR reliability map to the depth parallax conversion unit 31L and the parallax synthesis unit 32L. When it is not necessary to particularly distinguish between the reliability calculation unit 63R and the reliability calculation unit 63L, the reliability calculation unit 63R and the reliability calculation unit 63L are simply referred to as the reliability calculation units 63 below.

Example of Configuration of Parallax Synthesis Unit

Figure 3:
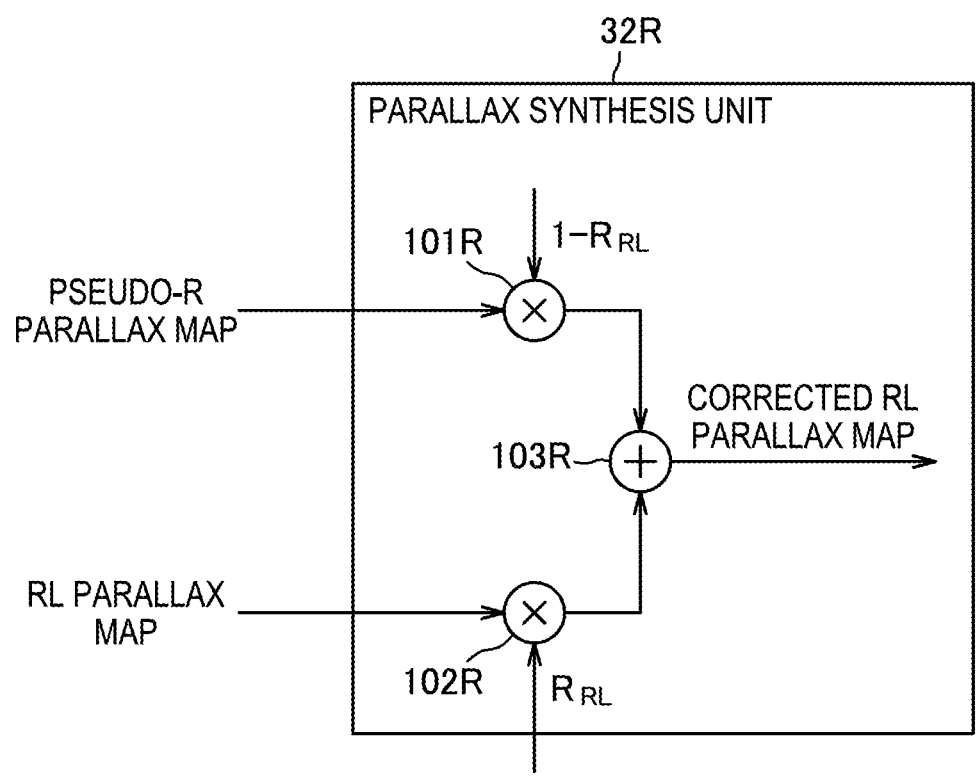
FIG. 3 is a diagram illustrating an example of the configuration of a parallax synthesis unit.

FIG. 3 shows an example of the detailed configuration of the parallax synthesis unit 32R.

That is, the parallax synthesis unit 32R includes a multiplying unit 101R, a multiplying unit 102R, and an adding unit 103R. The parallax synthesis unit 32R supplies the RL reliability map supplied from the reliability calculation unit 63R as a weight without change to the multiplying unit 102R and supplies a weight determined in accordance with the RL reliability map to the multiplying unit 101R.

The multiplying unit 101R multiplies the R pseudo-parallax map supplied from the depth parallax conversion unit 31R by the supplied weight and supplies the multiplying result to the adding unit 103R. The multiplying unit 102R multiples the RL parallax map supplied from the corresponding point detection unit 61R by the supplied weight and supplies the multiplying result to the adding unit 103R.

The adding unit 103R adds the R pseudo-parallax map from the multiplying unit 101R to the RL parallax map from the multiplying unit 102R to generate a corrected RL parallax map, and then outputs the corrected RL parallax map to a rear stage block.

Since the parallax synthesis unit 32L has the same configuration as the parallax synthesis unit 32R in FIG. 3, the configuration of the parallax synthesis unit 32L is not illustrated and the description thereof will not be repeated. Units of the parallax synthesis unit 32L corresponding to the multiplying unit 101R, the multiplying unit 102R, and the adding unit 103R are referred to as a multiplying unit 101L, a multiplying unit 102L, and an adding unit 103L, respectively.

When it is not necessary to distinguish between the multiplying units 101R and 101L, the multiplying units 101R and 101L are simply referred to as the multiplying units 101 below. When it is not necessary to distinguish between the multiplying units 102R and 102L, the multiplying units 102R and 102L are simply referred to as the multiplying units 102 below. When it is not necessary to distinguish between the adding units 103R and 103L, the adding units 103R and 103L are simply referred to as the adding units 103 below.

Description of Parallax Detection Process

When the image processing apparatus 11 is supplied with the stereoscopic image formed by the right and left images and receives an instruction to detect the parallax, the image processing apparatus 11 generates the corrected parallax maps by performing a parallax detection process and outputs the corrected parallax maps. Hereinafter, the parallax detection process of the image processing apparatus 11 will be described with reference to the flowchart of FIG. 4.

In step S11, the parallax detection unit 21 generates the parallax maps and the reliability maps by performing a parallax map generation process and supplies the parallax maps and the reliability maps to the unifying unit 23. The parallax map generation process will be described in detail later. When the parallax detection unit 21 performs the parallax map generation process, the parallax detection unit 21 supplies the generated parallax map and the generated reliability map to the depth parallax conversion unit 31 and the parallax synthesis unit 32.

In step S12, the depth information estimation units 22 generate the depth information maps and supply the depth information maps to the depth parallax conversion units 31. That is, the depth information estimation unit 22R generates the R depth information map based on the supplied right image and supplies the R depth information map to the depth parallax conversion unit 31R. The depth information estimation unit 22L generates the L depth information map based on the supplied left image and supplies the L depth information map to the depth parallax conversion unit 31L.

For example, the depth information estimation unit 22R extracts high-pass components from the right image by a filtering process or the like and divides the right image into a plurality of blocks. Then, the depth information estimation unit 22R generates the R depth information map by calculating a sum (integrated value) of the absolute values of the values of the high-pass components at respective positions in the block for each block. The depth information estimation unit 22L generates the L depth information map by performing the same processes.

Since the high-frequency components are generally abundant in a subject viewed (positioned) on the front side in a view from a user, that is, the region of a foreground or a focused region on an image, the value (integrated value of the high-pass components) of the pixels of the R depth information map corresponding to this region. Accordingly, as a region has larger pixel values of the pixels in the R depth information map, the region of the right image located at the same position as the region can be estimated as a region of a subject closer to the user who views the right image. A method of estimating the depth in an image is disclosed in detail in, for example, Japanese Unexamined Patent Application Publication No. 2007-208399.

For example, the depth information estimation unit 22 may generate the depth information map by specifying the colors of the pixels on an image, setting the pixels with colors of the warm color system to the pixels of a subject located on the front side, and setting the pixels with colors of the cold color system to the pixels of a subject located on the rear side. Such a depth information map is generated using the human visual characteristic that the colors of the warm color system are viewed to be located on the front side.

For example, the depth information estimation unit 22 may recognize a scene for an image (a right image or a left image) and output a depth information map determined in advance for the recognized scene.

As a method of generating the depth information map, any method such as a method of using the existing 2D-to-3D conversion technology may be used, as long as depth information is estimated and a map indicating the depth information is generated. For example, the 2D-to-3D conversion technology is described in detail in "JVC, "Real-time 2D-to-3D Conversion at Full HD 1080P Resolution" The 13th IEEE International Symposium on Consumer Electronics (ISCE2009), "Toshiba "2D-to-3D content conversion technology" at 2010 annual conference of Image Information and Television Engineers", or the like.

In step S13, the depth parallax conversion unit 31 generates a conversion equation used to convert the depth information to parallax information based on the depth information maps from the depth information estimation units 22, the parallax maps from the corresponding point detection units 61, and the reliability maps from the reliability calculation units 63.

For example, in an ij coordinate system in which the direction of a parallax of the right and left images is an i direction and a direction perpendicular to the i direction is a j direction, it is assumed that the pixel value of a pixel of the R depth information map located at the same position as a pixel located at coordinates (i, j) on the right image is $O_R(i, j)$. Further, it is assumed that a pixel value of a pixel of the R pseudo-parallax map located at the same position as a pixel located at coordinates (i, j) on the right image is $PDP_R(i, j)$. Here, the pixel value $PDP_R(i, j)$ of the pixel of the R pseudo-parallax map is a value to be calculated hereinafter.

At this time, the depth parallax conversion unit 31R models a relation between the parallax information and the depth information. That is, the depth parallax conversion unit 31R supposes that the pixel value $O_R(i, j)$ of a pixel of the R depth information map is linearly converted to the pixel value $PDP_R(i, j)$ of a pixel of the R pseudo-parallax map by Equation (1) below. In Equation (1), p and q are an integer.

$$PDP_R(i,j) = p \times O_R(i,j) + q \tag{1}$$

The depth information map indicates depth information of each subject on the right image. The characteristics of the depth information are different from those of the parallax information detected as a position deviation between the right and left images. Therefore, to synthesize the depth information map and the parallax map, it is necessary to match the characteristics of these maps.

Accordingly, the depth parallax conversion unit 31R calculates a linear function "$p \times O_R(i, j) + q$" to convert the pixel value $O_R(i, j)$, which is the depth information, to the equivalent parallax information by this linear function.

Specifically, the depth parallax conversion unit 31R calculates the integers p and q, for which the value of Equation (2) below is the minimum, by the least square method on the assumption that the pixel value of a pixel of the RL parallax map located at the same position as a given pixel located at coordinates (i, j) on the right image is $DP_{RL}(i, j)$.

$$F_R = \sum_{(i,j) \in \{(i,j) | R_{RL}(i,j) \geq T1\}} |DP_{RL}(i, j) - p \times O_R(i, j) - q|^2 \tag{2}$$

That is, the depth parallax conversion unit 31R extracts, from the pixels of the RL parallax map, only the pixels having a pixel value equal to or greater than a predetermined threshold value T1 in the RL reliability map and located at the same positions as the pixels of the RL parallax map. Then, the depth parallax conversion unit 31R calculates "$DP_{RL}(i, j) - p \times O_R(i, j) - q$" for each of the extracted pixels based on the pixel value $DP_{RL}(i, j)$ of each of the extracted pixels and the pixel value $O_R(i, j)$ of each of the pixels located at the same positions as the extracted pixels. Further, the depth parallax conversion unit 31R calculates the integers p and q for which a sum $F_R$ of the square of the obtained difference is the minimum.

A conversion equation "$p \times O_R(i, j) + q$" used to convert the depth information to the parallax information, that is, the right side of Equation (1) described above, can be obtained from the obtained integers p and q. Further, the depth parallax conversion unit 31L performs the same processes as the depth parallax conversion unit 31R to calculate a conversion equation used to convert the L depth information map to the L pseudo-parallax map.

Thus, the depth information map with the depth information can be suitably converted to the pseudo-parallax map having the parallax information by calculating the conversion equation used to convert the depth information to the parallax information.

The foregoing description pertains to an example in which the linear function is used as the conversion equation. However, the conversion equation is not limited to the linear function, but may be any function. Since the relation between the parallax information and the depth information is different depending on how the depth information is calculated, the relation may be modeled suitably in accordance with the depth information map and the conversion equation may be calculated.

In step S14, the depth parallax conversion units 31 convert the depth information maps to the pseudo-parallax maps using the conversion equation calculated by the process of step S13, and then supply the converted pseudo-parallax maps to the multiplying units 101 of the parallax synthesis units 32.

For example, the depth parallax conversion unit 31R sets the value, which is obtained by substituting the pixel value $O_R(i, j)$ of each pixel of the R depth information map to Equation (1) described above, to the pixel value $PDP_R(i,j)$ of each pixel of the R pseudo-parallax map located at the same position as the pixel of the R-depth information map. The depth parallax conversion unit 31L performs the same process as the depth parallax conversion unit 31R to generate the L pseudo-parallax map and supplies the L pseudo-parallax map to the multiplying unit 101L.

In step S15, the parallax synthesis units 32 perform a corrected parallax map generation process to generate the corrected parallax maps.

The corrected parallax map generation process will be described in detail later. In the corrected parallax map generation process, the parallax map and the pseudo-parallax map are synthesized (unified) and the synthesized parallax map is considered as the corrected parallax map. For example, in a region where the reliability of the parallax map is high, the parallax map is used without synthesis and is considered as the corrected parallax map. In a region where the reliability of the parallax map is low, the contribution ratio of the pseudo-parallax map is set to be higher when the corrected parallax map is generated.

When the corrected parallax map generation process is performed, the generated corrected parallax maps are output to the rear stage, and then the parallax detection process ends.

In this way, the image processing apparatus 11 generates the parallax maps from the right and left images, generates the depth information map from one of the right and left images, and converts the depth information maps into the pseudo-parallax maps. Then, the image processing apparatus 11 synthesizes the parallax maps and the pseudo-parallax maps in accordance with the reliabilities of the parallax maps and generates the corrected parallax maps as the final parallax detection result.

Thus, the parallax can be detected more accurately and reliably by unifying the parallax maps and the pseudo-parallax maps in accordance with the reliabilities of the parallax maps and generating the corrected parallax maps as the final parallax detection result.

For example, in a region, such as a flat portion or a repeating pattern portion, where it is difficult to match the right and left images, the pixel value of each pixel of the reliability map decreases and the reliability of the parallax map is thus lowered. In this case, however, since the parallax estimated from one of the right and left images, that is, the pseudo-parallax map, is used more, the more accurate parallax of the stereoscopic image can be obtained compared to the case where only the parallax map is used.

Description of Parallax Map Generation Process

Next, a parallax map generation process corresponding to the process of step S11 in FIG. 4 will be described with reference to the flowchart of FIG. 5.

In step S41, the parallax map generation units 71 generate the parallax maps based on the supplied right and left images and supply the parallax maps to the matching degree calculation unit 62 and the parallax synthesis units 32.

For example, the parallax map generation unit 71L detects the corresponding pixels of the right image to the pixels of the left image by block matching or the like.

Figure 6:
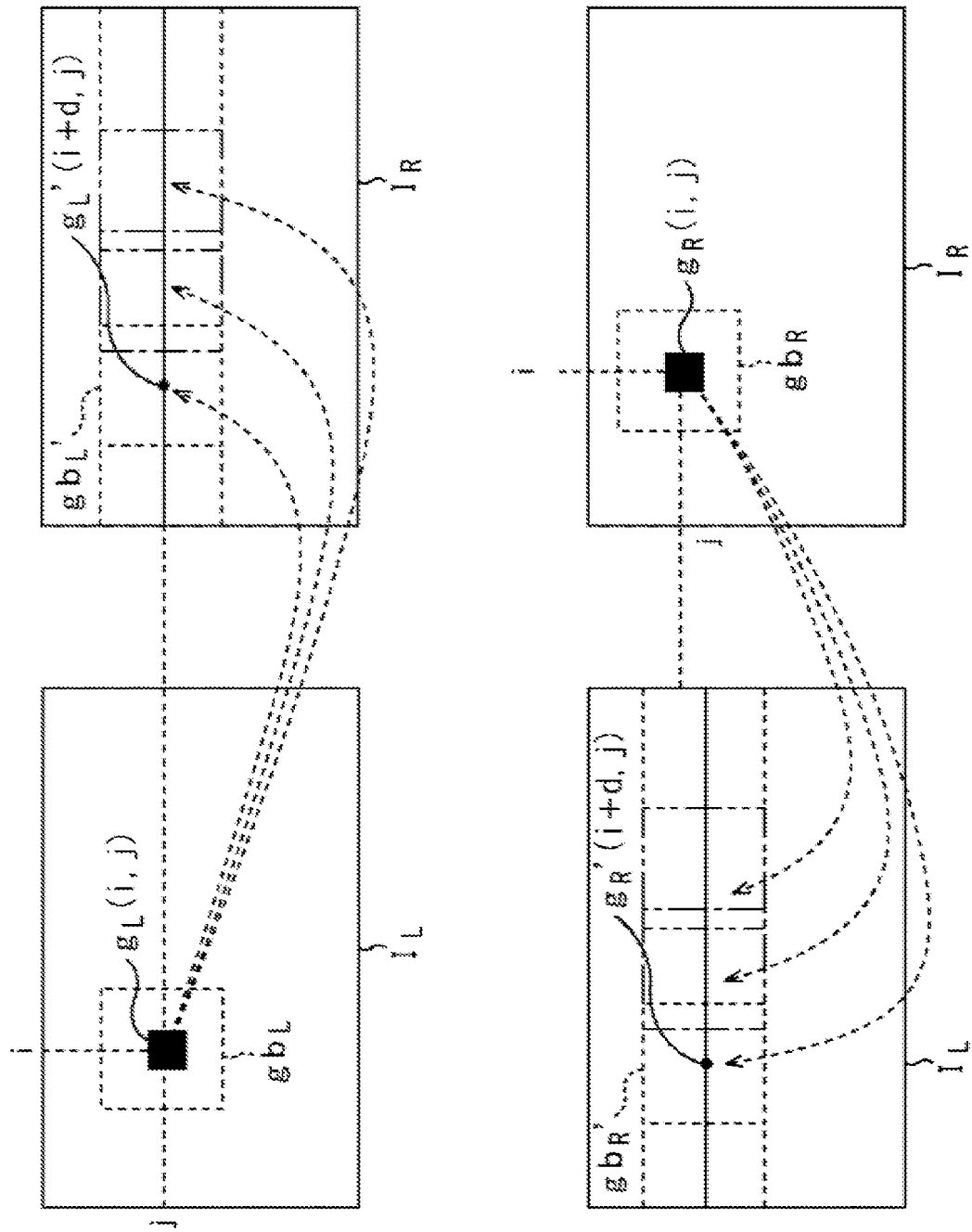
FIG. 6 is a diagram illustrating detection of a corresponding pixel.

Specifically, as shown in the upper side of FIG. 6, the parallax map generation unit 71L sets one pixel on a left image $I_L$ as an interest pixel $g_L(i, j)$ and sets a pixel on a right image $I_R$, which is a candidate of the corresponding point to the interest pixel $g_L(i, j)$, to a pixel $g_L'(i+d, j)$. Here, the pixel $g_L'(i+d, j)$, which is a candidate of the corresponding point, has the same j coordinate as the interest pixel $g_L(i, j)$. The pixel $g_L'(i+d, j)$ is a pixel located at a position distant by d pixels in the direction from the same position of the interest pixel of the right image $I_R$.

In FIG. 6, the horizontal and vertical directions represent the i and j directions of the ij coordinate system. Further, it is assumed that $I_L(i, j)$ is the pixel value of a pixel with coordinates (i, j) on the left image $I_L$ and $I_R(i, j)$ is the pixel value of a pixel with coordinates (i, j) on the right image $I_R$. For example, a pixel with the pixel value $I_L(i, j)$ on the left image $I_L$ is a pixel that is located at an i-th position from the left end of the left image $I_L$ and at a j-th position from the upper end of the left image $I_L$.

The parallax map generation unit 71L calculates, as a residual $R_{i,j}(d)$ at the interest pixel, a difference absolute value sum of the pixel value of a pixel inside a predetermined region $gb_L$ centering the interest pixel $g_L(i, j)$ and the pixel value of a pixel inside a predetermined region $gb_L'$ centering the pixel $g_L'(i+d, j)$.

That is, the parallax map generation unit 71L calculates the residual $R_{i,j}(d)$ by Equation (3) below.

$$R_{i,j}(d) = \sum_{di=-l}^{l} \sum_{dj=-k}^{k} |I_L(i+di, j+dj) - I_R(i+d+di, j+dj)| \quad (3)$$

The parallax map generation unit 71L calculates the residual $R_{i,j}(d)$ of the interest pixel for each d, that is, the candidate of each corresponding pixel, while varying the value of d within a preset range (for example, $-d_{rng} \le d \le d_{rng}$).

Here, the residual $R_{i,j}(d)$ is a difference absolute value sum of the pixel value of a pixel inside the region $gb_L$ near the interest pixel $g_L(i, j)$ and the pixel value of a pixel inside the region $gb_L'$ near the pixel $g_L'(i+d, j)$ which is the candidate of the interest pixel. Accordingly, the more similar the region $gb_L$ and the region $gb_L'$ are, the smaller the residual $R_{i,j}(d)$ is.

Thus, the parallax map generation unit 71L sets the pixel $g_L'(i+d, j)$ with the minimum residual $R_{i,j}(d)$ among the pixels of the right image $I_R$ as the corresponding pixel of the interest pixel and calculates the pixel value $DP_{LR}(i, j)$ of the pixel of the LR parallax map located at the same position as the interest pixel $g_L(i, j)$ by Equation (4) below.

$$DP_{LR}(i,j) = \{d | \text{MIN}[R_{i,j}(d)]\} \quad (4)$$

That is, the value of d when the residual $R_{i,j}(d)$ is the minimum is detected as the parallax at the interest pixel $g_L(i, j)$ of the left image $I_L$ between the right image $I_R$ and the left image $I_L$. The parallax d (pixel value $DP_{LR}(i,j)$) is a value that is obtained by subtracting the i coordinate of the interest pixel from the i coordinate of the corresponding pixel.

The parallax map generation unit 71L sequentially sets the pixels of the left image $I_L$ as the interest pixels and generates the LR parallax map by calculating the pixel values $DP_{LR}(i, j)$ of the pixels of the LR parallax map located at the same position as the interest pixels. The parallax map generation unit 71L supplies the generated LR parallax map to the matching degree calculation unit 62 and the multiplying unit 102L.

Further, the parallax map generation unit 71R performs the same processes as the parallax map generation unit 71L. That is, the parallax map generation unit 71R generates the RL parallax map by calculating the pixel values $DP_{RL}(i, j)$ of the pixels of the RL parallax map located at the same positions as the interest pixels.

That is, for example, as shown in the lower side of FIG. 6, the parallax map generation unit 71R sets one pixel of the right image $I_R$ to an interest pixel $g_L(i, j)$ and sets the pixel of the left image $I_L$ which is a candidate of the corresponding point of the interest pixel $g_L(i, j)$ to a pixel $g_R'(i+d, j)$.

The parallax map generation unit 71R calculates, as a residual at the interest pixel, a difference absolute value sum of the pixel value of a pixel inside a predetermined region $gb_R$ centering the interest pixel $g_R(i, j)$ and the pixel value of a pixel inside a predetermined region $gb_R'$ centering the pixel $g_R'(i+d, j)$. That is, the same calculation performed by Equation (3) described above is performed.

The parallax map generation unit 71R sets the value of d obtained at the minimum residual as the parallax at the interest pixel $g_R(i, j)$ of the right image $I_R$ between the right image $I_R$ and the left image $I_L$ and sets the value of the parallax to the pixel value $DP_{RL}(i, j)$ of the pixel of the RL parallax map located at the same position as the interest pixel. That is, the pixel value $DP_{RL}(i, j)$ is a value that is obtained by subtracting the i coordinate of the interest pixel from the i coordinate of the corresponding pixel.

The parallax map generation unit 71R sequentially sets the pixels of the right image $I_R$ as the interest pixels and generates the RL parallax map by calculating the pixel values $DP_{RL}(i, j)$ of the pixels of the RL parallax map located at the same position as the interest pixels. The parallax map generation unit 71R supplies the generated RL parallax map to the matching degree calculation unit 62 and the multiplying unit 102R.

Figure 5:
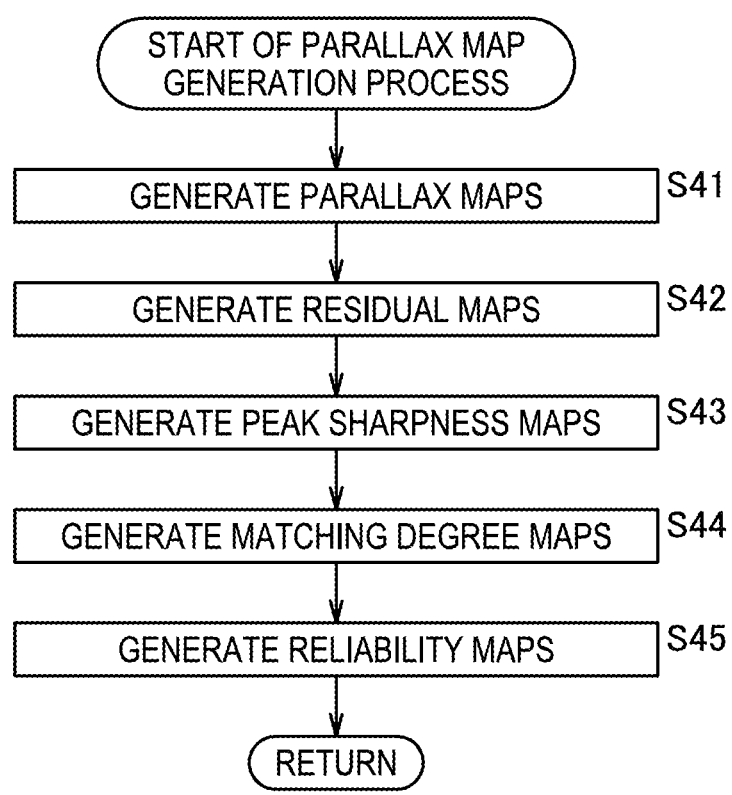
FIG. 5 is a flowchart illustrating a parallax map generation process.

Referring back to the flowchart of FIG. 5, in step S42, the residual map generation units 72 generate the residual maps based on the parallax maps of the right and left images and supply the residual maps to the reliability calculation unit 63.

For example, the residual map generation unit 72L sequentially sets the pixels of the left image and calculates pixel values $E_{LR}(i, j)$ of the pixels of the LR residual map located at the same positions as the interest pixels having the coordinates (i, j) by Equation (5) below.

$$E_{LR}(i, j) = \qquad (5)$$
$$N_1\left(\sum_{di=-l}^{l} \sum_{dj=-k}^{k} |I_L(i+di, j+dj) - I_R(i + DP_{LR}(i, j) + di, j + dj)|\right)$$

That is, a difference absolute value sum of the pixel value of a pixel inside a region near the interest pixel of the left image and the pixel value of a pixel inside a region near the corresponding pixel of the right image is substituted into a predetermined function $N_1(x)$ to obtain the pixel value $E_{LR}(i, j)$ of a pixel of the LR residual map.

Figure 7:
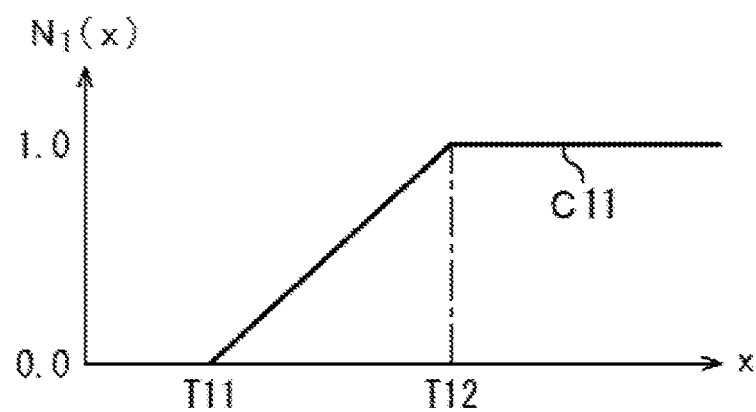
FIG. 7 is a diagram illustrating a function of calculating a residual.

Here, for example, the function $N_1(x)$ is a function shown in FIG. 7. In FIG. 7, the vertical axis represents the value of the function $N_1(x)$ and the horizontal axis represents the value of x substituted into the function $N_1(x)$, that is, the value of the difference absolute value sum.

In FIG. 7, a folded line C11 represents the value of the function $N_1(x)$ for each value of x. In the range of "$0 \leq x \leq T11$", the function $N_1(x)$ is equal to 0. Further, in the range of "$x \geq T12$", the function $N_1(x)$ is equal to 1. Furthermore, in the range of "$T11 \leq x \leq T12$", the value of the function $N_1(x)$ increases in proportion to the value of x.

Accordingly, the more the region near the interest pixel and the region near the corresponding pixel of the interest pixel are similar, that is, the smaller the difference absolute value sum (residual) of the regions is, the smaller the pixel value $E_{LR}(i, j)$ of the pixel of the LR residual map is.

The residual map generation unit 72L generates the LR residual map by setting the pixels of the left image to the interest pixels and calculating the pixel values $E_{LR}(i, j)$ of the pixels of the LR residual map corresponding to the interest pixels, and then supplies the LR residual map to the reliability calculation unit 63L. The more the parallax of the pixel of the left image located at the same pixel of the generated LR residual map is reliable, the smaller the pixel value of the pixel of the generated LR residual map is.

Likewise, the residual map generation unit 72R sequentially sets the pixels of the left image and calculates pixel values $E_{RL}(i, j)$ of the pixels of the RL residual map located at the same positions as the interest pixels having the coordinates (i, j) by Equation (6) below.

$$E_{RL}(i, j) = \qquad (6)$$
$$N_1\left(\sum_{di=-l}^{l} \sum_{dj=-k}^{k} |I_R(i+di, j+dj) - I_L(i + DP_{RL}(i, j) + di, j + dj)|\right)$$

That is, a difference absolute value sum of the pixel value of a pixel inside a region near the interest pixel of the right image and the pixel value of a pixel inside a region near the corresponding pixel of the left image is substituted into the function $N_1(x)$ to obtain the pixel value $E_{RL}(i, j)$ of a pixel of the RL residual map.

Even in the RL residual map, the smaller the difference absolute value sum (residual) of the region near the interest pixel and the region near the corresponding pixel of the interest pixel is, the smaller the pixel value $E_{RL}(i, j)$ of the pixel of the RL residual map is. Accordingly, the more the parallax of the pixel of the right image located at the same pixel of the RL residual map is reliable, the smaller the pixel value of the pixel of the RL residual map is.

The residual map generation unit 72R generates the RL residual map by setting the pixels of the right image to the interest pixels and calculating the pixel values $E_{RL}(i, j)$ of the pixels of the RL residual map corresponding to the interest pixels, and then supplies the RL residual map to the reliability calculation unit 63R.

In step S43, the peak sharpness map generation units 73 generate the peak sharpness maps based on the supplied right and left images and supply the peak sharpness maps to the reliability calculation units 63.

For example, the peak sharpness map generation unit 73L sequentially sets the pixels of the left image to interest pixels. Then, the peak sharpness map generation unit 73L calculates a pixel value $PK_{LR}(i, j)$ of a pixel of the LR peak sharpness map located at the same position as the interest pixel based on the calculation result of the residual $R_{i, j}(d)$, which is calculated by the parallax map generation unit 71L, for each parallax d in the interest pixel.

Figure 8:
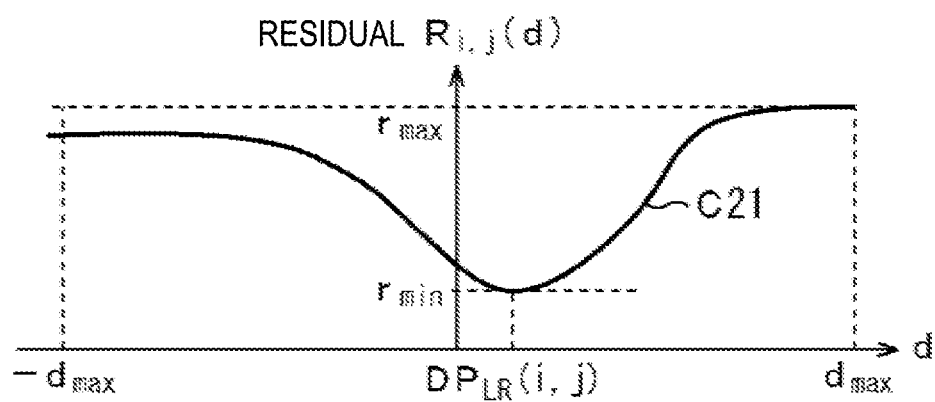
FIG. 8 is a diagram illustrating the sharpness of a peak of the residual.

Specifically, for example, a result shown in FIG. 8 is obtained as the calculation result of the residual $R_{i, j}(d)$ for each parallax d (the candidate of the corresponding pixel) in the interest pixel of the left image. In FIG. 8, the horizontal axis represents the parallax d between the interest pixel and the candidate of the corresponding pixel and the vertical axis represents the value of the residual $R_{i, j}(d)$ for each parallax d.

In the example of FIG. 8, a curve C21 represents the residual $R_{i,j}(d)$ for each parallax d. In the curve C21, the parallax of the interest pixel is equal to $DP_{LR}(i, j)$ at the downward convex peak position, that is, the position of d at which the residual $R_{i,j}(d)$ is the minimum.

The residual $R_{i,j}(d)$ for each parallax d is a residual calculated for the candidate of each corresponding pixel by Equation (3). Therefore, as the depth of the peak in the curve C21 is deeper and the width of the peak portion is narrower, that is, the relatively small residual is further focused in the narrow range, the sharpness of the peak is larger. Here, when it is assumed that $r_{max}$ is the maximum value of the residual $R_{i,j}(d)$ and $r_{min}$ is the minimum value of the residual $R_{i,j}(d)$, the depth of the peak of the residual can be defined by, for example, "$r_{max} - r_{min}$."

As the larger the peak sharpness is, the smaller the candidates of the corresponding pixel are in number. Therefore, the calculated parallax $DP_{LR}(i, j)$ of the interest pixel is more reliable. In contrast, in a flat portion or repeating pattern portion in which it is difficult to detect the corresponding pixel on an image, the peak of the residual is shallow and the peak width is larger.

The peak sharpness map generation unit 73L calculates the pixel value $PK_{LR}(i, j)$ of the LR peak sharpness map configured to estimate the reliability of the parallax shown by the LR parallax map by using the peak sharpness of the residual as an index.

That is, the peak sharpness map generation unit 73L calculates Equation (7) below based on the calculation result of the residual $R_{i,j}(d)$ for each parallax d in the interest pixel having the coordinates (i, j) and calculates an evaluation value $PKH_{LR}(i, j)$ for which the depth of the peak of the residual is used as an index.

$$PKH_{LR}(i,j) = N_2(r_{max} - r_{min}) \tag{7}$$

That is, a difference between the maximum value $r_{max}$ and the minimum value $r_{min}$ of the residual $R_{i,j}(d)$ is substituted into a predetermined function $N_2(x)$ to obtain the evaluation value $PKH_{LR}(i, j)$.

Figure 9:
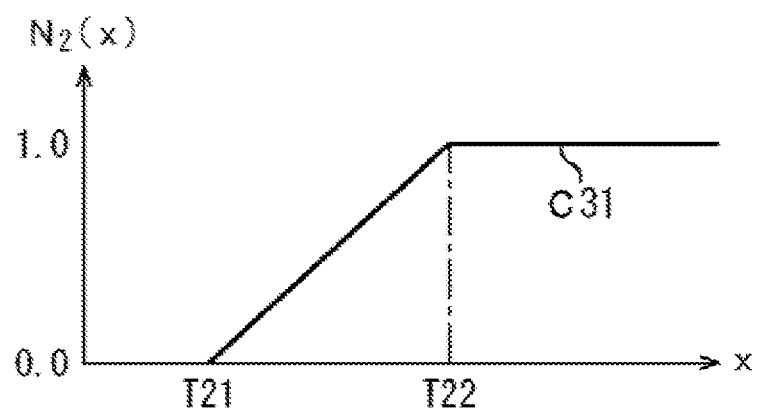
FIG. 9 is a diagram illustrating a function of calculating an evaluation value of the depth of a peak.

Here, for example, the function $N_2(x)$ is a function shown in FIG. 9. In FIG. 9, the vertical axis represents the value of the function $N_2(x)$ and the horizontal axis represents the value of x substituted into the function $N_2(x)$, that is, the value of the difference absolute value sum.

In FIG. 9, a folded line C31 represents the value of the function $N_2(x)$ for each value of x. In the range of "$0 \le x \le T21$", the function $N_2(x)$ is equal to 0. Further, in the range of "$x \ge T22$", the function $N_2(x)$ is equal to 1. Furthermore, in the range of "$T21 \le x \le T22$", the value of the function $N_2(x)$ increases in proportion to the value of x. Accordingly, the deeper (larger) the depth of the peak of the residual is, the larger the value of the evaluation value $PKH_{LR}(i, j)$ is.

Next, the peak sharpness map generation unit 73L calculates Equation (8) below based on the calculation result of the residual $R_{i,j}(d)$ for each parallax d in the interest pixel having the coordinates (i, j) and calculates an evaluation value $PKW_{LR}(i, j)$ for which the width of the peak of the residual is used as an index.

$$PKW_{LR}(i, j) = N_3\left(\frac{\sum_{d=-d_{rng}}^{d_{rng}} (r_{max} - R_{i,j}(d))}{(2d_{rng} + 1)(r_{max} - r_{min})}\right) \tag{8}$$

That is, an aggregate sum of the differences between the maximum value $r_{max}$ and the residual $R_{i,j}(d)$ is calculated for each parallax d (the candidate of the corresponding pixel) within a range of "$-d_{rng} \le d \le d_{rng}$" which is a preset range of d. Then, a value obtained by subtracting "$(2d_{rng}+1)(r_{max}-r_{min})$" from the calculated aggregate sum of the differences is substituted into a predetermined function $N_3(x)$ to obtain an evaluation value $PKW_{LR}(i, j)$. Here, the narrower (the smaller) the width of the peak of the residual is, the smaller the term of the function $N_3(x)$ in the evaluation value $PKW_{LR}(i, j)$ is.

Figure 10:
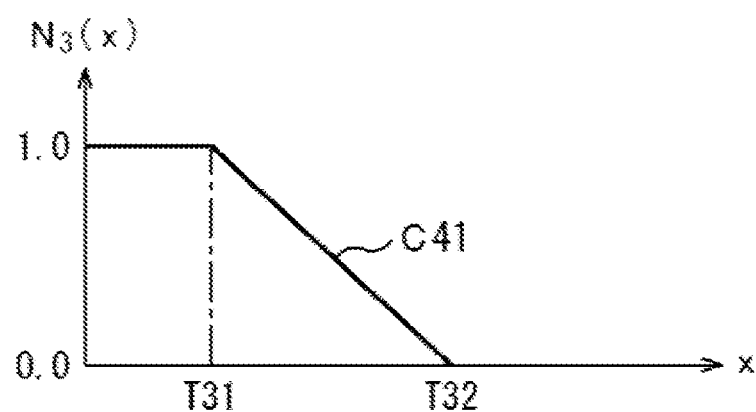
FIG. 10 is a diagram illustrating a function of calculating an evaluation value of the width of a peak.

Further, the function $N_3(x)$ is a function shown in FIG. 10. In FIG. 10, the vertical axis represents the value of the function $N_3(x)$ and the horizontal axis represents the value of x substituted into the function $N_3(x)$, that is, "$\Sigma(r_{max} - R_{i,j}(d))/((2d_{rng}+1)(r_{max}-r_{min}))$."

In FIG. 10, a folded line C41 represents the value of the function $N_3(x)$ for each value of x. In the range of "$0 \le x \le T31$", the function $N_3(x)$ is equal to 1. Further, in the range of "$x \le T32$", the function $N_3(x)$ is equal to 0. Furthermore, in the range of "$T31 \le x \le T32$", the value of the function $N_3(x)$ decreases in inverse proportion to the value of x. Accordingly, the narrower the width of the peak of the residual is, the larger the value of the evaluation value $PKW_{LR}(i, j)$ is.

Further, the peak sharpness map generation unit 73L calculates the pixel value $PK_{LR}(i, j)$ of the pixel of the LR peak sharpness map by substituting the calculated evaluation values $PKH_{LR}(i, j)$ and $PKW_{LR}(i, j)$ into Equation (9) below.

$$PK_{LR}(i,j) = PKH_{LR}(i,j)PKW_{LR}(i,j) \tag{9}$$

That is, a product of evaluation values $PKH_{LR}(i, j)$ and $PKW_{LR}(i, j)$ calculated for the interest pixel is the pixel value $PK_{LR}(i, j)$ of a pixel of the LR peak sharpness map located at the same position as the interest pixel.

The deeper the peak of the residual is and the narrower the width of the peak is, the larger the pixel value $PK_{LR}(i, j)$ is. In other words, the larger the sharpness of the peak of the residual is and the more the parallax of the interest pixel is, the larger the pixel value $PK_{LR}(i, j)$ is.

The peak sharpness map generation unit 73L generates the LR peak sharpness map by setting the pixels of the left image as the interest pixels and calculating the pixel value $PK_{LR}(i, j)$ of the pixels of the LR peak sharpness map located at the same positions as the interest pixels. The peak sharpness map generation unit 73L supplies the generated LR peak sharpness map to the reliability calculation unit 63L.

The peak sharpness map generation unit 73R also performs the same processes as the peak sharpness map generation unit 73L to generate the RL peak sharpness map and supplies the generated RL peak sharpness map to the reliability calculation unit 63R.

In step S44, the matching degree calculation unit 62 generates the matching degree maps based on the RL parallax map from the corresponding point detection unit 61R and the LR parallax map from the corresponding point detection unit 61L, and then supplies the matching degree maps to the reliability calculation units 63.

Figure 11:
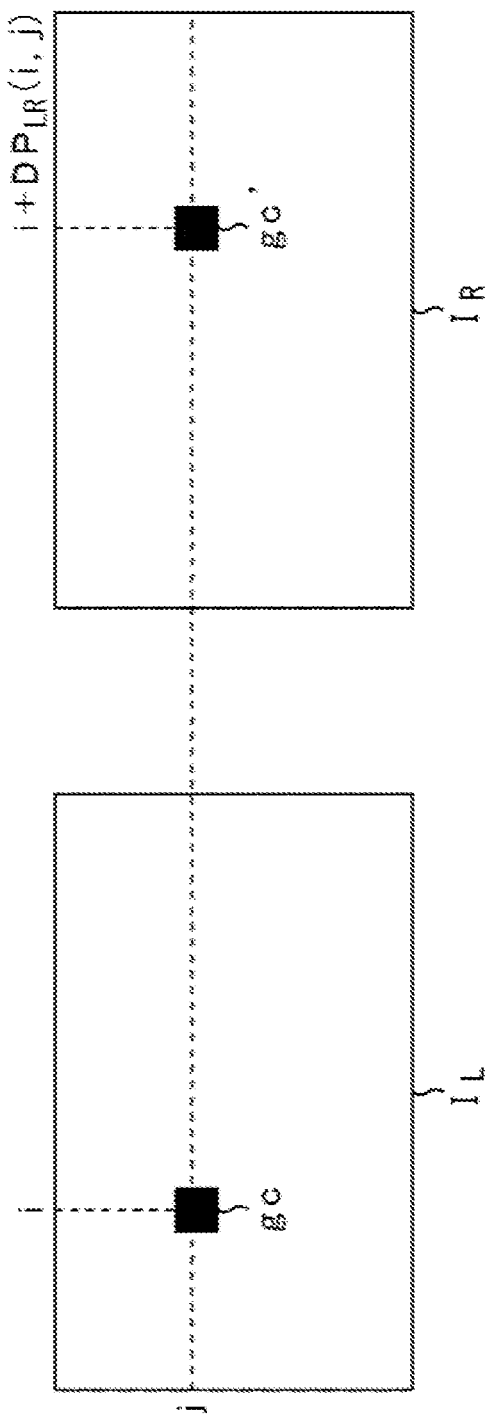
FIG. 11 is a diagram illustrating calculation of a matching degree.

For example, as shown in FIG. 11, the coordinates of a corresponding pixel gc' of the right image $I_R$ for a pixel gc located at the coordinates (i, j) on the left image $I_L$ can be obtained from the $L_R$ parallax map. That is, on the assumption that $DP_{LR}(i, j)$ is the pixel value of a pixel located at the same position as the pixel gc on the LR parallax map, the coordinates of the corresponding pixel gc' are $(i+DP_{LR}(i, j), j)$.

On the other hand, when the corresponding pixel gc' is interested on the right image $I_R$, the coordinates of the corresponding pixel of the left image $I_L$ with respect to the corresponding pixel gc' are (i+DP$_{LR}$(i, j)+DP$_{LR}$(i+DP$_{LR}$(i, j), j), j) from the pixel value of the pixel located at the same position as the pixel gc' of the RL parallax map.

Accordingly, when the corresponding pixel of the left image I$_L$ with respect to the corresponding pixel gc' is the pixel gc, the corresponding pixel gc' of the pixel gc is appropriately obtained, and thus a correspondence between the pixel gc and the corresponding pixel gc' is achieved. That is, the pixel gc matches the corresponding pixel gc' and the same subject is displayed at these pixels.

Here, since the corresponding pixel of the corresponding pixel gc' is the pixel gc, the coordinates (i+DP$_{LR}$(i, j)+DP$_{LR}$(i+DP$_{LR}$(i,j),j),j) of the corresponding pixel may be identical with the coordinates (i, j) of the pixel gc. Therefore, "DP$_{LR}$(i, j)+DP$_{LR}$(i+DP$_{LR}$(i, j), j)=0" is achieved. Further, when DP$_{LR}$(i, j)+DP$_{LR}$(i+DP$_{LR}$(i, j), j) is not equal to 0 but the absolute value thereof is a small value, the correspondence between the pixels is achieved to some extent.

Therefore, the matching degree calculation unit 62 calculates the matching degree between the pixels of the left image and the corresponding pixels of the pixels of the left image by Equation (10) below and calculates a pixel value C$_{LR}$(i, j) of each pixel of the LR matching degree map located at the same position as the pixel of the left image.

$$C_{LR}(i,j)=N_4(|DP_{LR}(i,j)+DP_{RL}(i+DP_{LR}(i,j),j)|) \quad (10)$$

That is, when a predetermined pixel of the left image is set to an interest pixel, the pixel value C$_{LR}$(i, j) of a pixel of the LR matching degree map located at the same position as the interest pixel can be calculated as follows. First, the absolute value of the sum of the pixel value of the pixel of the LR parallax map located at the same position as the interest pixel and the pixel value of the pixel of the RL parallax map located at the same position as the corresponding pixel of the interest pixel is calculated. Then, the calculated absolute value of the sum is substituted into a predetermined function N$_4$(x) to obtain the pixel value C$_{LR}$(i, j). The more the correspondence between the interest pixel and the corresponding pixel is achieved, the larger the pixel value C$_{LR}$(i, j) is.

Figure 12:
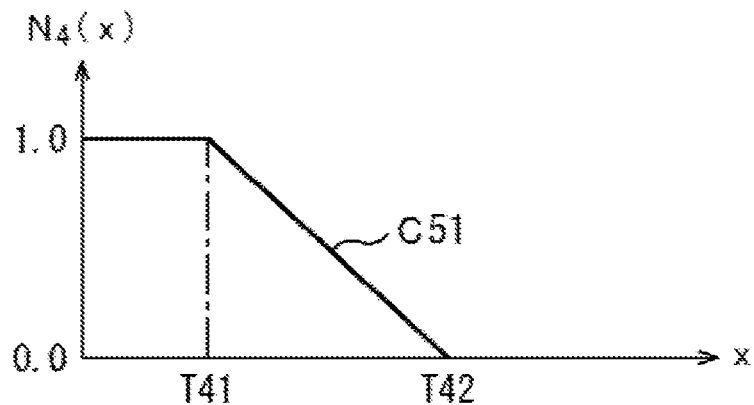
FIG. 12 is a diagram illustrating a function of calculating the matching degree.

Here, for example, the function N$_4$(x) is a function shown in FIG. 12. In FIG. 12, the vertical axis represents the value of the function N$_4$(x) and the horizontal axis represents the value of x substituted into the function N$_4$(x), that is, "|DP$_{LR}$(i, j)+DP$_{RL}$(i+DP$_{LR}$(i, j), j)|."

In FIG. 12, a folded line C51 represents the value of the function N$_4$(x) for each value of x. In the range of "0≤x≤T41", the function N$_4$(x) is equal to 1. Further, in the range of "x≥T42", the function N$_4$(x) is equal to 0. Furthermore, in the range of "T41≤x≤T42", the value of the function N$_4$(x) decreases in inverse proportion to the value of x. Accordingly, the higher the matching degree between the pixel of the left image and the corresponding pixel of the pixel of the left image is, the larger the pixel value C$_{LR}$(i, j) of the pixel of the LR matching degree map is.

The matching degree calculation unit 62 generates the LR matching degree map by calculating the pixel values of the pixels of the LR matching degree map, and then supplies the generated LR matching degree map to the reliability calculation unit 63L. Further, the matching degree calculation unit 62 calculates Equation (11) below based on the LR parallax map and the RL parallax map to calculate the pixel values C$_{LR}$(i, j) of the pixels of the RL matching degree map.

$$C_{RL}(i,j)=N_4(|DP_{RL}(i,j)+DP_{LR}(i+DP_{RL}(i,j),j)|) \quad (11)$$

In Equation (11), DP$_{LR}$(i, j) and DP$_{RL}$(i, j) denote the pixel value of a pixel of the LR parallax map and the pixel value of a pixel of the RL parallax map, respectively, and N$_4$(x) denotes the same function as the function N$_4$(x) of Equation (10).

The matching degree calculation unit 62 generates the RL matching degree map by calculating the pixel values of the pixels of the RL matching degree map, and then supplies the generated RL matching degree map to the reliability calculation unit 63R.

In step S45, the reliability calculation units 63 generate the reliability maps based on the residual maps and the peak sharpness maps from the corresponding point detection units 61 and the matching degree maps from the matching degree calculation units 62.

For example, the reliability calculation unit 63L calculates a pixel value R$_{LR}$(i, j) of the interest pixel by setting each pixel of the LR reliability map to be generated as the interest pixel and calculating Equation (12) below based on the pixel value of each pixel of each of the LR residual map, the LR matching degree map, and the LR peak sharpness map located at the position of the interest pixel.

$$R_{LR}(i,j)=\alpha(1-E_{LR}(i,j))+\beta C_{LR}(i,j)+\gamma PK_{LR}(i,j) \quad (12)$$

In Equation (12), E$_{LR}$(i, j), C$_{LR}$(i, j), and PK$_{LR}$(i, j) denote the pixel values of the pixels of the LR residual map, the LR matching degree map, and the LR peak sharpness map, respectively. Further, α, β, and γ are predetermined weights set in advance. The weights are determined to satisfy Equation (13) below.

$$\alpha+\beta+\gamma=1 \quad (13)$$

Thus, the LR reliability map is calculated by adding the LR residual map, the LR matching degree map, and the LR peak sharpness map in a weighted manner. Further, the smaller the residual between a pixel of the left image and the corresponding pixel of the pixel of the left image is, the larger the peak sharpness of the residual is, and the higher the matching degree between the pixels is, the larger the pixel value of the pixel of the LR reliability map is. Accordingly, the larger the pixel value of the pixel of the LR reliability map is, the higher the reliability of the parallax represented by the LR parallax map is.

The reliability calculation unit 63L generates the LR reliability map, and then supplies the LR reliability map to the depth parallax conversion unit 31L and the parallax synthesis unit 32L.

The reliability calculation unit 63R calculates Equation (14) using the RL residual map, the RL matching degree map, and the RL peak sharpness map and the weights α, β, and γ determined in Equation (13) above to calculates R$_{RL}$(i, j) of each pixel of the RL reliability map.

$$R_{RL}(i,j)=\alpha(1-E_{RL}(i,j))+\beta C_{RL}(i,j)+\gamma PK_{RL}(i,j) \quad (14)$$

In Equation (14), E$_{RL}$(i, j), C$_{RL}$(i, j), and PK$_{RL}$(i, j) denote the pixel values of the pixels of the RL residual map, the RL matching degree map, and the RL peak sharpness map, respectively. The reliability calculation unit 63R generates the RL reliability map, and then supplies the RL reliability map to the depth parallax conversion unit 31R and the parallax synthesis unit 32R.

Figure 4:
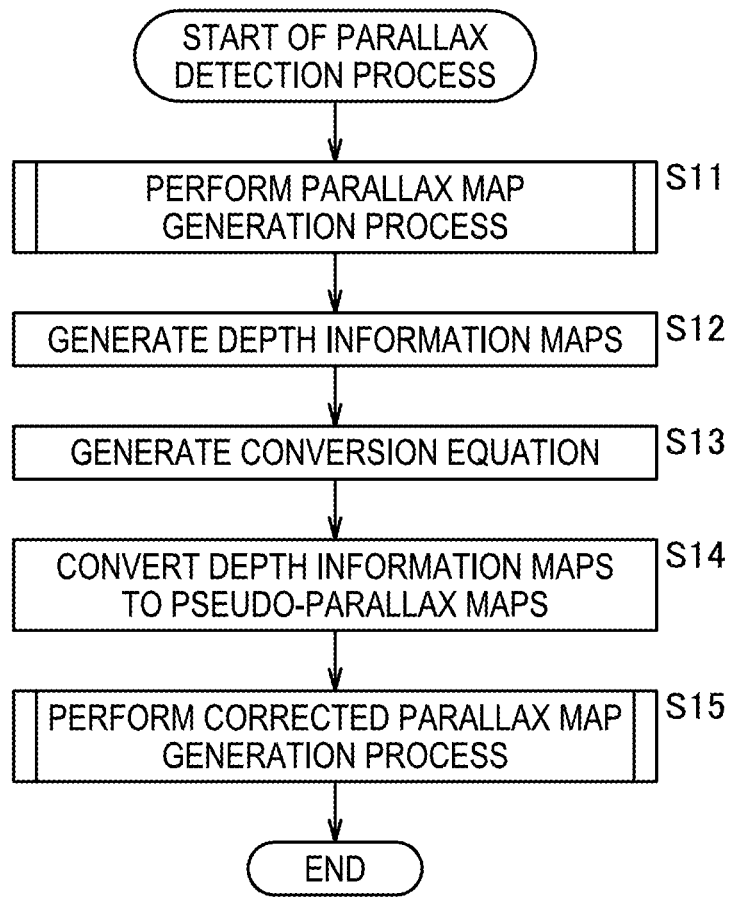
FIG. 4 is a flowchart illustrating a parallax detection process.

When the reliability maps are generated, the parallax map generation process ends, and then the process proceeds to step S12 of FIG. 4.

Thus, the parallax detection unit 21 generates the parallax maps and the reliability maps from the right and left images. When not only the parallax maps but also the reliability maps indicating the reliability are generated, it is possible to specify how the parallax represented by the parallax maps is reliable for each region of a stereoscopic image. Accordingly, the corrected parallax maps indicating the more accurate parallax can be obtained in the rear stage.

Description of Corrected Parallax Map Generation Process

Figure 13:
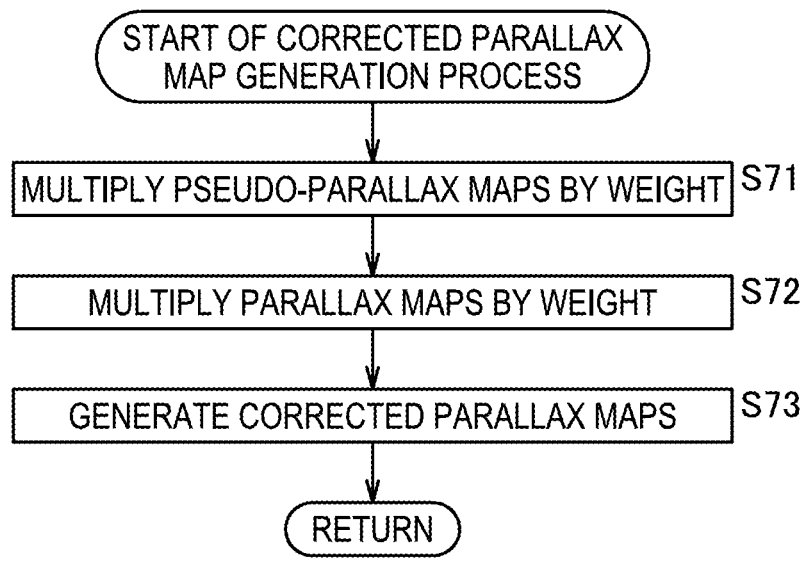
FIG. 13 is a flowchart illustrating a corrected parallax map generation process.

Next, a corrected parallax map generation process corresponding to the process of step S15 of FIG. 4 will be described with reference to the flowchart of FIG. 13.

In step S71, the multiplying units 101 multiply the pseudo-parallax maps supplied from the depth parallax conversion units 31 by a weight.

For example, when the RL reliability map is supplied from the reliability calculation unit 63R, the parallax synthesis unit 32R supplies the multiplying unit 102R with the pixel value $R_{RL}(i, j)$ of each pixel of the RL reliability map as the weight of each pixel without change. Further, the parallax synthesis unit 32R supplies the multiplying unit 101R with a value of "$1-R_{RL}(i, j)$" obtained by subtracting the pixel value $R_{RL}(i, j)$ of each pixel of the RL reliability map from 1 as the weight of each pixel.

The multiplying unit 101R multiplies the pixel value $PDP_R(i, j)$ of each pixel of the R pseudo-parallax map by the supplied weight "$1-R_{RL}(i, j)$" of each pixel, and then supplies the calculation result to the adding unit 103R. At this time, the pixel value of each pixel of the R pseudo-parallax map is multiplied by the weight obtained from the pixel value of each pixel of the reliability map located at the same position as each pixel of the R pseudo-parallax map.

As in the parallax synthesis unit 32R, the multiplying unit 101L of the parallax synthesis unit 32L multiplies the pixel value $PDP_L(i, j)$ of each pixel of the L pseudo-parallax map supplied from the depth parallax conversion unit 31L by a supplied weight "$1-R_{LR}(i, j)$", and then supplies the calculation result to the adding unit 103L.

In step S72, the multiplying units 102 multiply the parallax maps supplied from the corresponding point detection units 61 by the supplied weights, and then supply the calculation result to the adding units 103.

For example, the multiplying unit 102R multiplies the pixel value of each pixel of the RL parallax map by the weight $R_{RL}(i, j)$ of each pixel, and then supplies the calculation result to the adding unit 103R. Likewise, the multiplying unit 102L multiplies the pixel value of each pixel of the LR parallax map by the weight $R_{LR}(i, j)$ of each pixel, and then supplies the calculation result to the adding unit 103L.

In step S73, the adding units 103 add the pseudo-parallax maps from the multiplying units 101 to the parallax maps from the multiplying units 102 to generate the corrected parallax maps and output the corrected parallax maps.

For example, the adding unit 103R sets a value, which is obtained by adding the R pseudo-parallax map multiplied by the weight to the pixel value of the pixel located at the same position as the RL parallax map multiplied by the weight, to a pixel value $DP_{RL}'(i, j)$ of each pixel of the corrected RL parallax map located at the position as the pixel.

That is, Equation (15) is calculated to obtain the pixel value $DP_{RL}'(i, j)$ of each pixel of the corrected RL parallax map.

$$DP_{RL}'(i,j)=R_{RL}(i,j)\times DP_{RL}(i,j)+(1-R_{RL}(i,j))\times PDP_R(i,j) \quad (15)$$

Of the pixels of the RL parallax map, the pixels with high reliability are used without conversion as the pixels of the corrected RL parallax map by the calculation of Equation (15). As for the pixels with low reliability, the pixels of the R pseudo-parallax map are used as the pixels of the corrected RL parallax map. Thus, the corrected parallax map indicating the more reliable parallax can be obtained in accordance with the reliability of each pixel of the parallax map. Further, to convert the parallax map and the pseudo-parallax map more smoothly, a smoothing process may be performed on the reliability map before the parallax map and the pseudo-parallax map are synthesized.

Likewise, the adding unit 103L adds the L pseudo-parallax map multiplied by the weight to the pixel value of each pixel located at the same position as the LR parallax map multiplied by the weight to generate the corrected LR parallax map, and then outputs the corrected LR parallax map.

When the corrected parallax maps are generated and output, the corrected parallax map generation process ends. Then, the process of step S15 in FIG. 4 also ends and the parallax detection process thus ends.

As described above, the parallax synthesis units 32 synthesize the parallax maps and the pseudo-parallax maps to generate the corrected parallax maps. Thus, more accurate and stable parallax information can be obtained by synthesizing the parallax maps obtained from the right and left images and the pseudo-parallax maps obtained from one image in accordance with the reliabilities of the parallax maps and generating the corrected parallax maps.

Modified Example 1

Example of Configuration of Parallax Synthesis Unit

The foregoing description pertains to an example in which each parallax map and each pseudo-parallax maps are added to each other in the weighted manner in accordance with the reliability and are synthesized. However, only the high-pass component of the pseudo-parallax map may be used for the synthesis.

Figure 14:
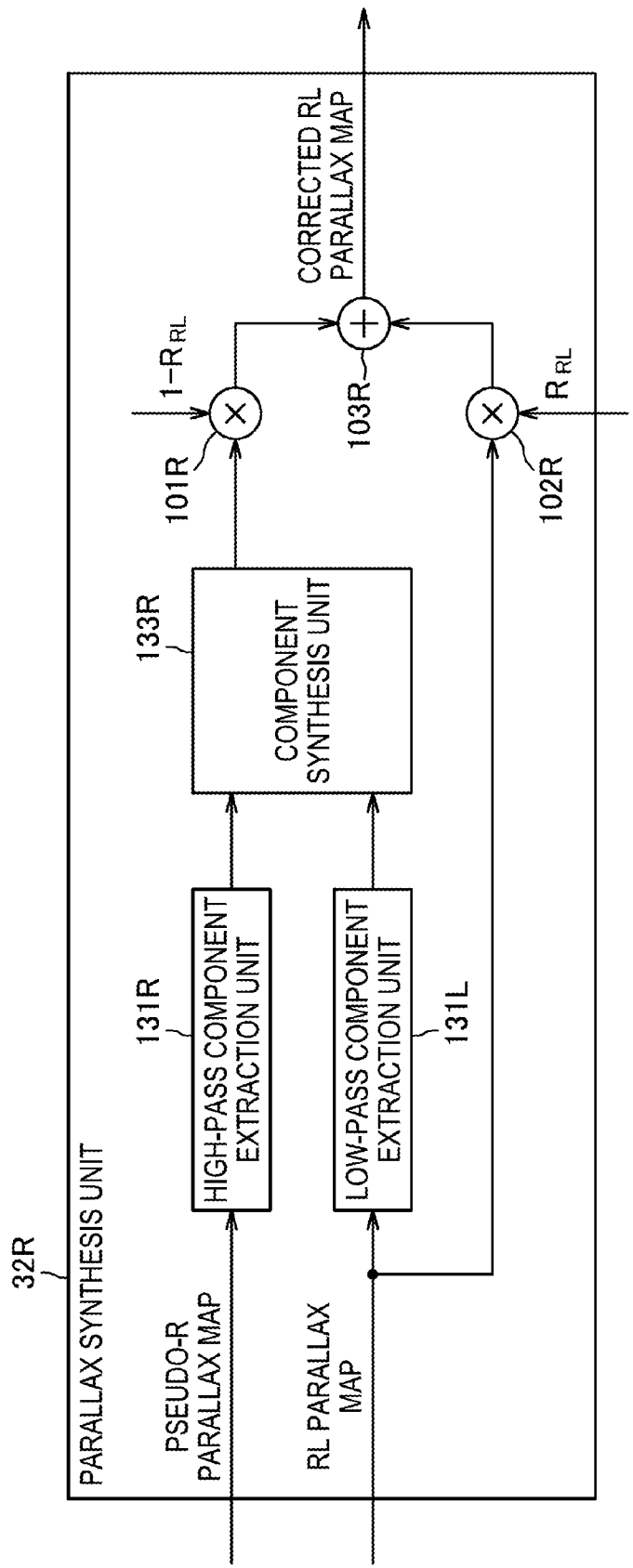
FIG. 14 is a diagram illustrating another example of the configuration of the parallax synthesis unit.

In this case, the parallax synthesis unit 32R in FIG. 1 has a configuration shown in, for example, FIG. 14. In FIG. 14, the same reference numerals are given to units corresponding to the units shown in FIG. 3 and the description thereof will appropriately not be repeated.

A parallax synthesis unit 32R in FIG. 14 includes a high-pass component extraction unit 131R, a low-pass component extraction unit 132R, a component synthesis unit 133R, a multiplying unit 101R, a multiplying unit 102R, and an adding unit 103R.

The high-pass component extraction unit 131R extracts a high-pass component from the R pseudo-parallax map supplied from the depth parallax conversion unit 31R, and then supplies the high-pass component to the component synthesis unit 133R. Further, the low-pass component extraction unit 132R extracts a low-pass component from the RL parallax map supplied from the corresponding point detection unit 61R, and then supplies the low-pass component to the component synthesis unit 133R.

The component synthesis unit 133R synthesizes the high-pass component from the high-pass component extraction unit 131R and the low-pass component from the low-pass component extraction unit 132R, and then supplies the synthesized map obtained as the synthesis result to the multiplying unit 101R. The multiplying unit 101R multiples the pixel value of each pixel of the synthesized map supplied from the component synthesis unit 133R by a supplied weight "$1-R_{RL}(i, j)$", and then supplies the calculation result to the adding unit 103R.

When the parallax synthesis unit 32R in FIG. 1 has the configuration shown in FIG. 14, the parallax synthesis unit 32L also has the same configuration as the parallax synthesis unit 32R shown in FIG. 14. Therefore, the parallax synthesis unit 32L is not illustrated and will not be described. Hereinafter, the units of the parallax synthesis unit 32L corresponding to the high-pass component extraction unit 131R, the low-pass component extraction unit 132R, and the component synthesis unit 133R are referred to as a high-pass component extraction unit 131L, a low-pass component extraction unit 132L, and a component synthesis unit 133L, respectively.

When it is not necessary to distinguish between the high-pass component extraction units 131R and 131L, between the low-pass component extraction units 132R and 132L, and between the component synthesis units 133R and 133L, respectively, the high-pass component extraction units 131R and 131L, the low-pass component extraction units 132R and 132L, and the component synthesis units 133R and 133L are referred to as the high-pass component extraction units 131, the low-pass component extraction units 132, and the component synthesis units 133, respectively, below.

Description of Corrected Parallax Map Generation Process

Figure 15:
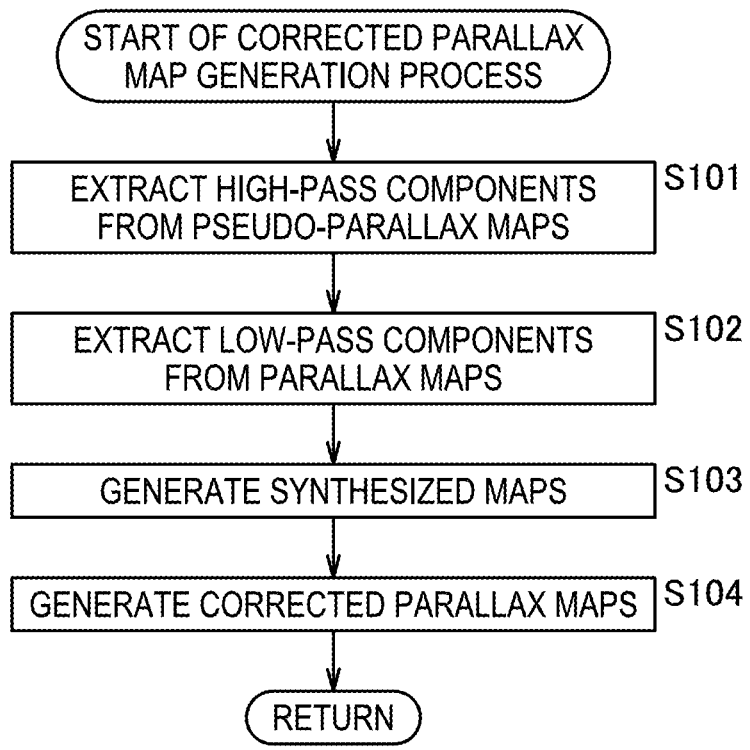
FIG. 15 is a flowchart illustrating a corrected parallax map generation process.

When each parallax synthesis unit 32 includes the high-pass component extraction unit 131, the low-pass component extraction unit 132, and the component synthesis unit 133, a corrected parallax map generation process in FIG. 15 is performed in step S15 of the parallax detection process described above in FIG. 4.

Hereinafter, the corrected parallax map generation process of the parallax synthesis unit 32 will be described with reference to the flowchart of FIG. 15.

In step S101, the high-pass component extraction units 131 extract the high-pass components from the pseudo-parallax maps by performing a filtering process or the like on the pseudo-parallax maps supplied from the depth parallax conversion units 31, and then supply the extracted high-pass components to the component synthesis units 133. In step S101, each of the high-pass component extraction units 131R and 131L extracts the high-pass component.

In step S102, the low-pass component extraction units 132 extract the low-pass components from the parallax maps by performing a filtering process or the like on the parallax maps supplied from the corresponding point detection units 61, and then supply the extracted low-pass components to the component synthesis units 133. In step S102, each of the low-pass component extraction units 132R and 132L also extracts the low-pass component.

In step S103 the component synthesis units 133 synthesize the high-pass components from the high-pass component extraction units 131 and the low-pass components from the low-pass component extraction units 132, and then supply the synthesized maps obtained as the synthesis result to the multiplying units 101.

For example, the pixel values of the pixels located at the same positions as the high-pass components and the low-pass components are added and are considered as the pixel values of the pixels of the synthesized maps located at the pixels. In step S103, each of the component synthesis units 133R and 133L also generates the synthesized map.

In step S104, the adding units 103 add the synthesized maps to the parallax maps to generate the corrected parallax maps.

For example, the multiplying unit 101R multiples the pixel value of each pixel of the synthesized map supplied from the component synthesis unit 133R by the weight "1−$R_{RL}$(i, j), and then supplies the calculation result to the adding unit 103R. Further, the multiplying unit 102R multiples the pixel value of each pixel of the RL parallax map from the corresponding point detection 61R by a weight $R_{RL}$(i, j), and then supplies the calculation result to the adding unit 103R. Then, the adding unit 103R adds the synthesized map from the multiplying unit 101R to the RL parallax map from the multiplying unit 102R to generate the corrected RL parallax map, and then the corrected RL parallax map.

When each synthesized map and each parallax map are synthesized, the pixels with high reliability are used without change as the pixels of each corrected parallax map. As for the pixels with low reliability, only the low-pass components of the parallax map are used and the pixels of the pseudo-parallax map are used as the high-pass components. Further, to convert the parallax map and the synthesized map more smoothly, a smoothing process may be performed on the reliability map before the parallax map and the synthesized map are synthesized.

The multiplying unit 101L, the multiplying unit 102L, and the adding unit 103L perform the same processes as the multiplying unit 101R, the multiplying unit 102R, and the adding unit 103R, respectively, to generate the corrected LR parallax map. When the corrected parallax map is generated and output, the corrected parallax map generation process ends. Then, the process of step S15 in FIG. 4 also ends and the parallax detection process thus ends.

Modified Example 2

Example of Configuration of Parallax Synthesis Unit

In FIG. 14, The foregoing description pertains to an example in which the high-pass component of the pseudo-parallax map and the low-pass component of the parallax map are synthesized to generate the synthesized map. However, the low-pass component of the pseudo-parallax map and the high-pass component of the parallax map may be synthesized to obtain the synthesized map.

Figure 16:
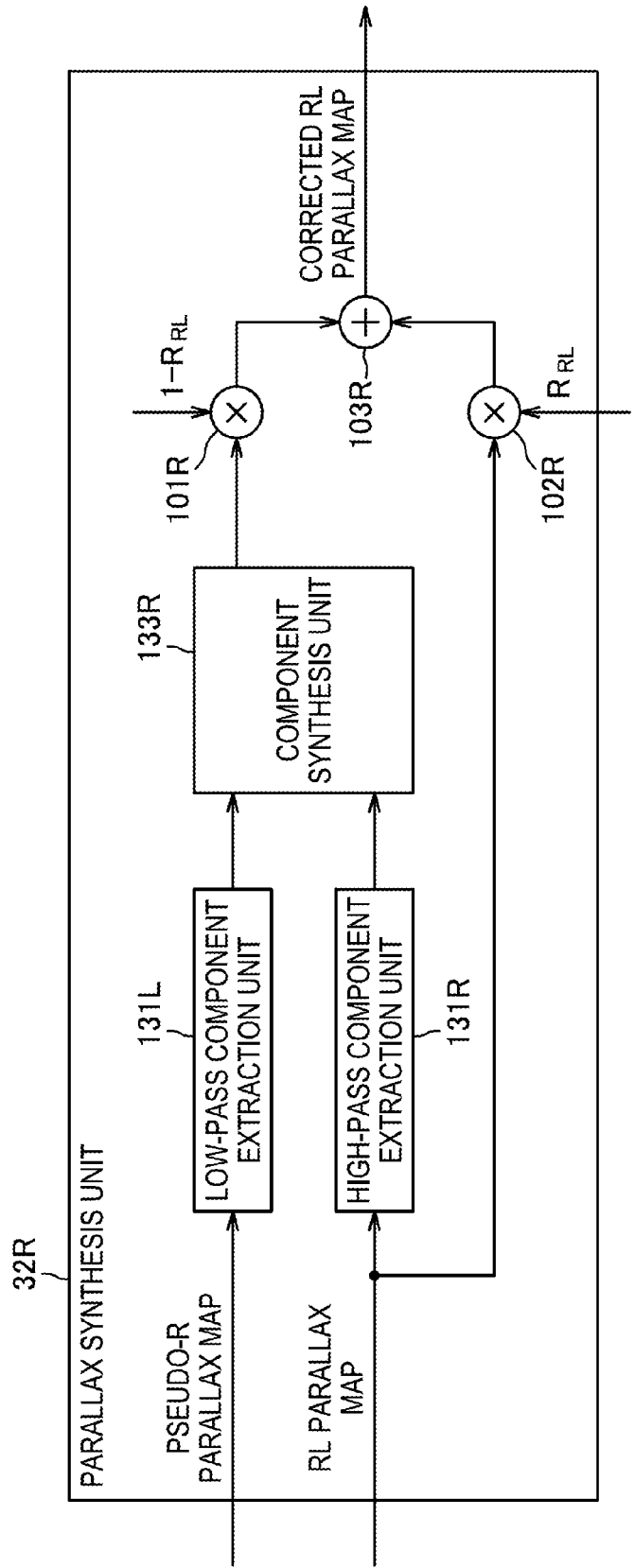
FIG. 16 is a diagram illustrating still another example of the configuration of the parallax synthesis unit.

In this case, the parallax synthesis unit 32R in FIG. 1 has a configuration shown in, for example, FIG. 16. In FIG. 16, the same reference numerals are given to units corresponding to the units shown in FIG. 14 and the description thereof will appropriately not be repeated.

A synthesis unit 32R in FIG. 16 includes a high-pass component extraction unit 131R, a low-pass component extraction unit 132R, a component synthesis unit 133R, a multiplying unit 101R, a multiplying unit 102R, and an adding unit 103R. In the parallax synthesis unit 32R in FIG. 16, the RL parallax map is supplied to the high-pass component extraction unit 131R and the R pseudo-parallax map is supplied to the low-pass component extraction unit 132R.

The high-pass component extraction unit 131R extracts a high-pass component from the RL parallax map supplied from the corresponding point detection unit 61R, and then supplies the high-pass component to the component synthesis unit 133R. Further, the low-pass component extraction unit 132R extracts a low-pass component from the R pseudo-parallax map supplied from the depth parallax conversion unit 31R, and then supplies the low-pass component to the component synthesis unit 133R.

When the parallax synthesis unit 32R has the configuration shown in FIG. 16, the parallax synthesis unit 32L also has the same configuration as the parallax synthesis unit 32R shown in FIG. 16. Therefore, the parallax synthesis unit 32L is not illustrated and will not be described.

Description of Corrected Parallax Map Generation Process

Figure 17:
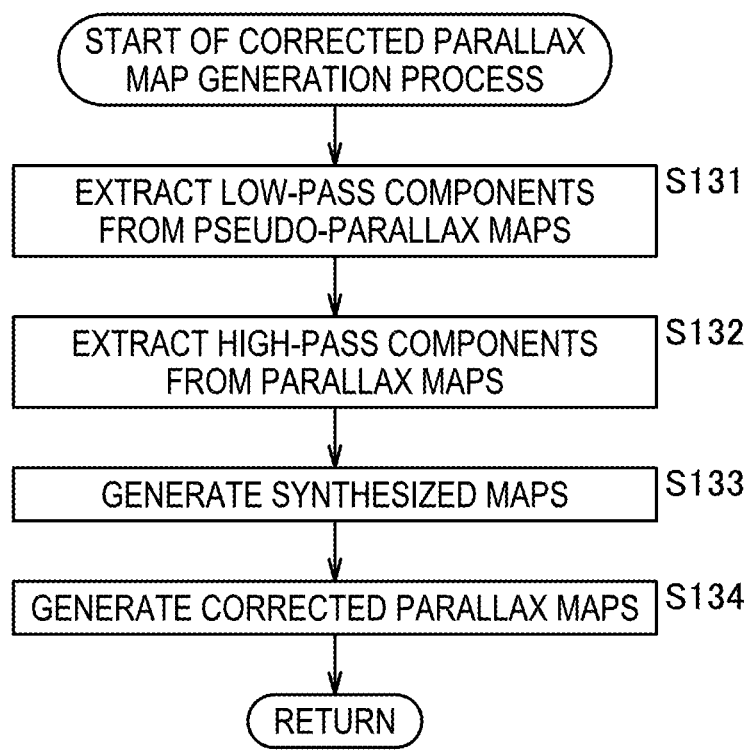
FIG. 17 is a flowchart illustrating a corrected parallax map generation process.

When the parallax synthesis unit 32R has the configuration shown in FIG. 16, a corrected parallax map generation process shown in FIG. 17 is performed in step S15 of the parallax detection process in FIG. 4.

Hereinafter, the corrected parallax map generation process of the parallax synthesis unit 32 will be described with reference to the flowchart of FIG. 17.

In step S131, the low-pass component extraction units 132 extract the low-pass components from the pseudo-parallax maps by performing a filtering process or the like on the pseudo-parallax maps supplied from the depth parallax conversion units 31, and then supply the extracted low-pass components to the component synthesis units 133. In step S131, each of the low-pass component extraction units 132R and 132L extracts the low-pass component.

In step S132, the high-pass component extraction units 131 extract the high-pass components from the parallax maps by performing a filtering process or the like on the parallax maps supplied from the corresponding point detection units 61, and then supply the extracted high-pass components to the component synthesis units 133. In step S132, each of the high-pass component extraction units 131R and 131L also extracts the high-pass component.

After the process of step S132, the processes of step S133 and step S134 are performed and the corrected parallax map generation process ends. Since these processes are the same as the processes of step S103 and step S104 in FIG. 15, the description thereof will not be repeated. However, in step S133, the low-pass component of the pseudo-parallax map and the high-pass component of the parallax map are synthesized to generate the synthesized map.

When the corrected parallax map generation process ends, step S15 in FIG. 4 also ends and the parallax detection process thus ends.

In the corrected parallax map generation process in FIG. 17, the pixels with high reliability are used without change as the pixels of each corrected parallax map. As for the pixels with low reliability, only the high-pass components of the parallax map are used and the pixels of the pseudo-parallax map are used as the low-pass components. Further, to convert the parallax map and the synthesized map more smoothly, a smoothing process may be performed on the reliability map before the parallax map and the synthesized map are synthesized.

Second Embodiment

Example of Configuration of Image Processing Apparatus

The foregoing description pertains to the case in which the parallax map and the pseudo-parallax map are synthesized to generate the corrected parallax map. However, the parallax maps may be generated using the right and left images and the pseudo-parallax maps.

Figure 18:
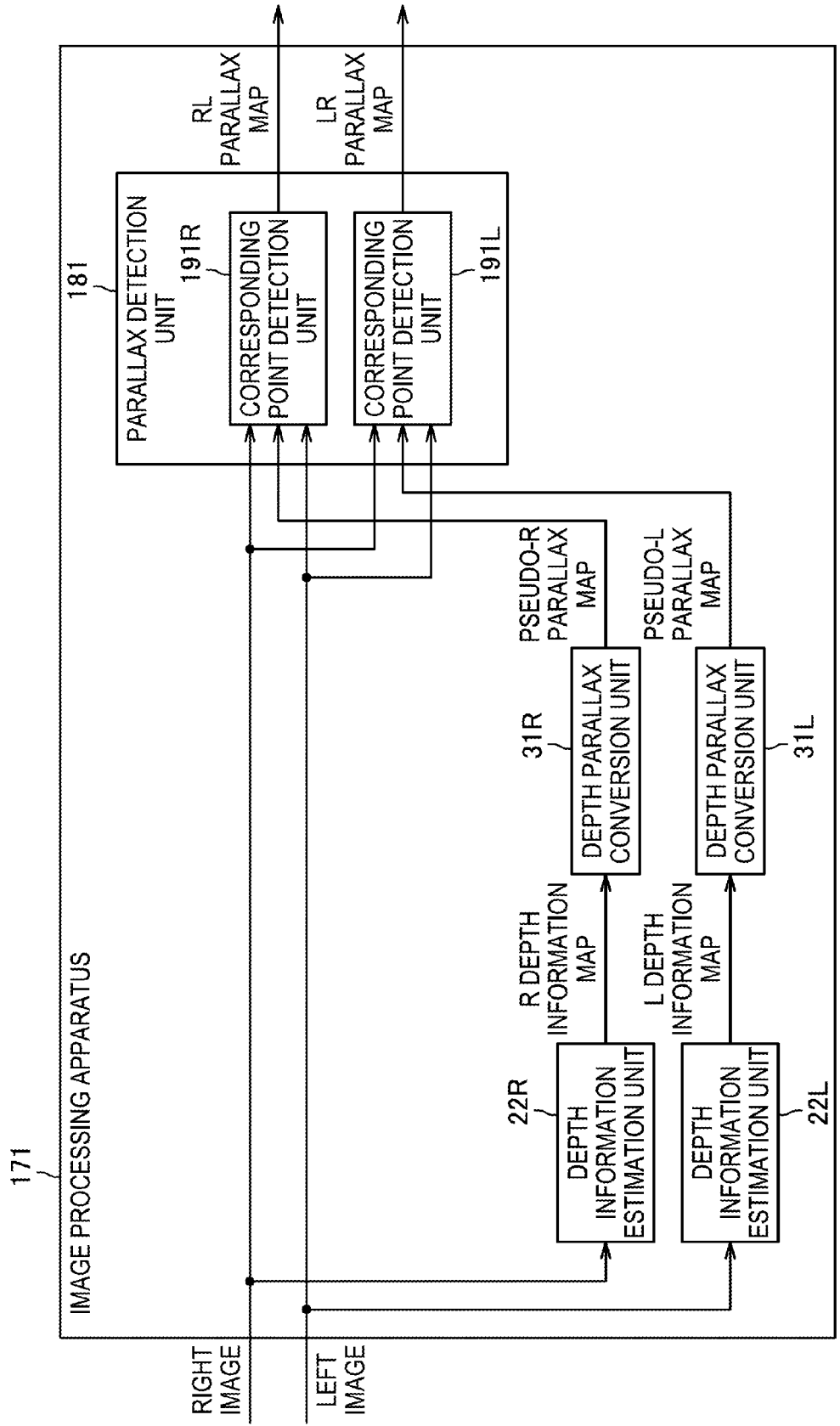
FIG. 18 is a diagram illustrating another example of the configuration of the image processing apparatus.

In this case, the image processing apparatus has a configuration shown in, for example, FIG. 18. In FIG. 18, the same reference numerals are given to units corresponding to the units shown in FIG. 1 and the description thereof will appropriately not be repeated.

An image processing apparatus 171 in FIG. 18 includes a depth information estimation unit 22R, a depth information estimation unit 22L, a depth parallax conversion unit 31R, a depth parallax conversion unit 31L, and a parallax detection unit 181.

The depth information estimation unit 22R generates an R depth information map based on a supplied right image and supplies the R depth information map to the depth parallax conversion unit 31R. Further, the depth information estimation unit 22L generates an L depth information map based on a supplied left image and supplies the L depth information map to the depth parallax conversion unit 31L.

The depth parallax conversion unit 31R the R depth information map supplied from the depth information estimation unit 22R into an R pseudo-parallax map, and then supplies the converted R pseudo-parallax map to the parallax detection unit 181. The depth parallax conversion unit 31L converts the L depth information map supplied from the depth information estimation unit 22L into an L pseudo-parallax map, and then supplies the converted L pseudo-parallax map to the parallax detection unit 181.

The parallax detection unit 181 generates a parallax map based on the supplied right and left images and the pseudo-parallax maps from the depth parallax conversion units 31 and outputs the generated parallax map. The parallax detection unit 181 includes corresponding point detection units 191R and 191L.

The corresponding point detection unit 191R generates an RL parallax map based on the supplied right and left images and the R pseudo-parallax map supplied from the depth parallax conversion unit 31R, and then outputs the generated RL parallax map. Further, the corresponding point detection unit 191L generates an LR parallax map based on the supplied right and left images and the L pseudo-parallax map supplied from the depth parallax conversion unit 31L, and then outputs the generated LR parallax map.

When it is not necessary to distinguish between the corresponding point detection units 191R and 191L, the corresponding point detection units 191R and 191L are simply referred to as the corresponding point detection units 191 below.

Description of Parallax Detection Process

Figure 19:
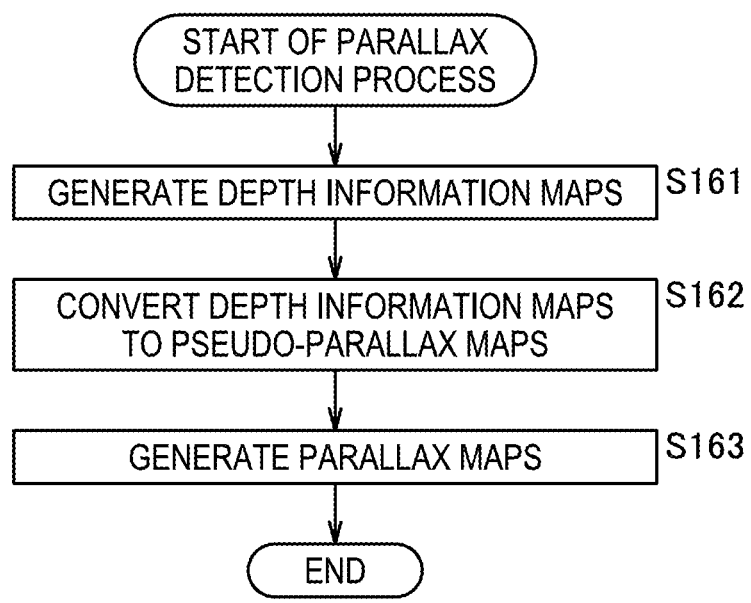
FIG. 19 is a flowchart illustrating a parallax detection process.

Next, a parallax detection process of the image processing apparatus 171 will be described with reference to the flowchart of FIG. 19.

In step S161, the depth information estimation units 22 generate the depth information maps based on the supplied right and left images, and then supply the generated depth information maps to the depth parallax conversion units 31. In step S161, the same process as the process of step S12 in FIG. 14 is performed.

In step S162, the depth parallax conversion units 31 convert the depth information maps supplied from the depth information estimation units 22 into the pseudo-parallax maps, and then supply the converted pseudo-parallax maps to the corresponding point detection unit 191.

For example, a conversion equation used to convert depth information such as "p×$O_R$(i, j)+q" described above to parallax information is recorded in advance in the depth parallax conversion units 31. In this case, the depth parallax conversion unit 31R converts the R depth information map into the R pseudo-parallax map using the recorded conversion equation and supplies the result to the corresponding point detection unit 191R. That is, the same process as the process of step S14 in FIG. 4 is performed.

Further, the depth parallax conversion unit 31L also converts the L depth information map into the L pseudo-parallax map using the recorded conversion equation and supplies the result to the corresponding point detection unit 191L.

In step S163, the corresponding point detection units 191 generate parallax maps based on the supplied right and left images and the pseudo-parallax maps from the depth parallax conversion units 31.

Figure 20:
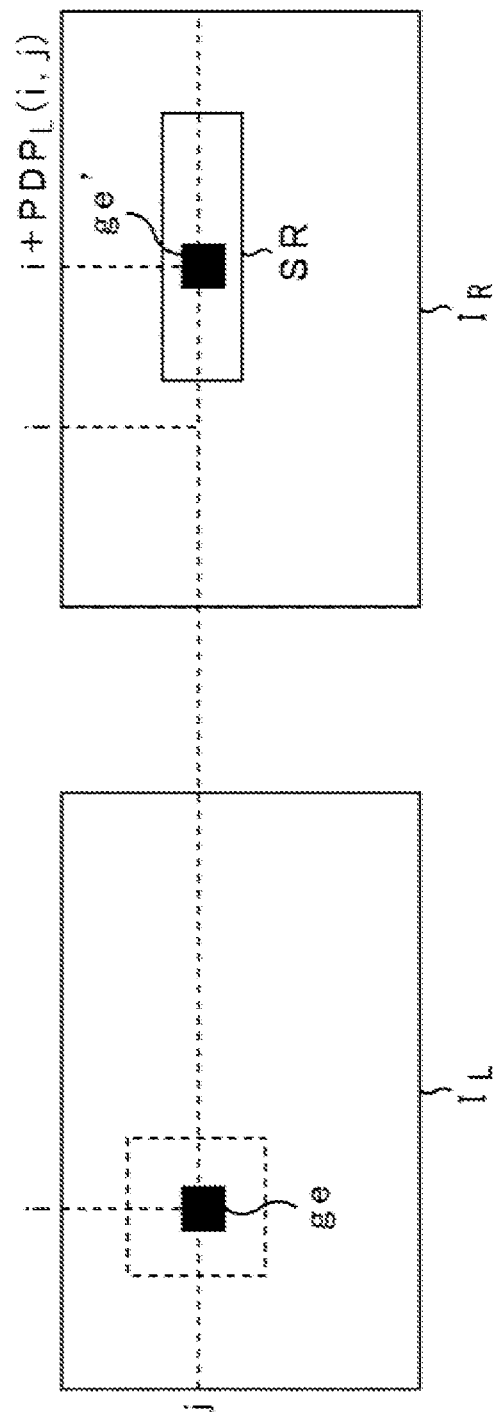
FIG. 20 is a diagram illustrating detection of a corresponding pixel.

For example, the corresponding point detection unit 191L sets one pixel of the left image $I_L$ to an interest pixel ge, as shown in FIG. 20. Here, the coordinates of the interest pixel ge in the ij coordinate system are (i, j). Next, the corresponding point detection unit 191L specifies a pixel value $PDP_L$(i, j) of a pixel of the L parallax map located at the same position as the interest pixel ge and sets a region, which has a preset size and centers coordinates (i+$PDP_L$(i, j), j) on the right image $I_R$, to a search region SR.

In the L pseudo-parallax map, the corresponding pixel of the interest pixel ge is a pixel ge' located at the coordinates (i+PDP$_L$(i, j), j) on the right image I$_R$. Therefore, there is a high possibility that the genuine corresponding pixel of the interest pixel ge is present near the pixel ge'.

Accordingly, the corresponding point detection unit 191L sets each pixel present within the search region SR near the pixel ge' as a candidate of the corresponding pixel and calculates a residual Ri, j(d) of each candidate by Equation (3) described above. Then, the corresponding point detection unit 191L calculates the pixel value DP$_{LR}$(i, j) of each pixel of the LR parallax map located at the same position as the interest pixel ge based on the residual and Equation (4).

The corresponding point detection unit 191L generates the LR parallax map by sequentially setting the pixels of the left image to the interest pixel and calculating the pixel value DP$_{LR}$(i, j) of each pixel of the LR parallax map located at the same position as the interest pixel.

Thus, the corresponding pixel can be more accurately and reliably by setting only each pixel present within the search region (search range) of the right image determined by the pseudo-parallax map to the candidate of the corresponding pixel, when the corresponding pixel corresponding to each pixel of the left image. Further, since the search range is restricted by the pseudo-parallax map, the corresponding pixel can be detected more rapidly.

The corresponding point detection unit 191L outputs the generated LR parallax map. Further, the corresponding point detection unit 191R performs the same process as the corresponding point detection unit 191L based on the right and left images and the R pseudo-parallax map to generate the RL parallax map, and then outputs the RL parallax map.

When the parallax maps are generated and output by the corresponding point detection units 191, the parallax detection process ends.

The image processing apparatus 171 generates the pseudo-parallax maps based on the right and left images and generates the parallax maps based on the right and left images and the pseudo-parallax maps. By appropriately setting the search range of the corresponding pixel based on the pseudo-parallax maps when the parallax maps are generated, the parallax can be reliably detected more rapidly and accurately.

The above-described series of processes may be performed by hardware or software. When the series of processes are performed by software, a program for the software is installed on, for example, a computer in which dedicated hardware is embedded or a general personal computer capable of executing various functions by installing various programs from a program recording medium.

Figure 21:
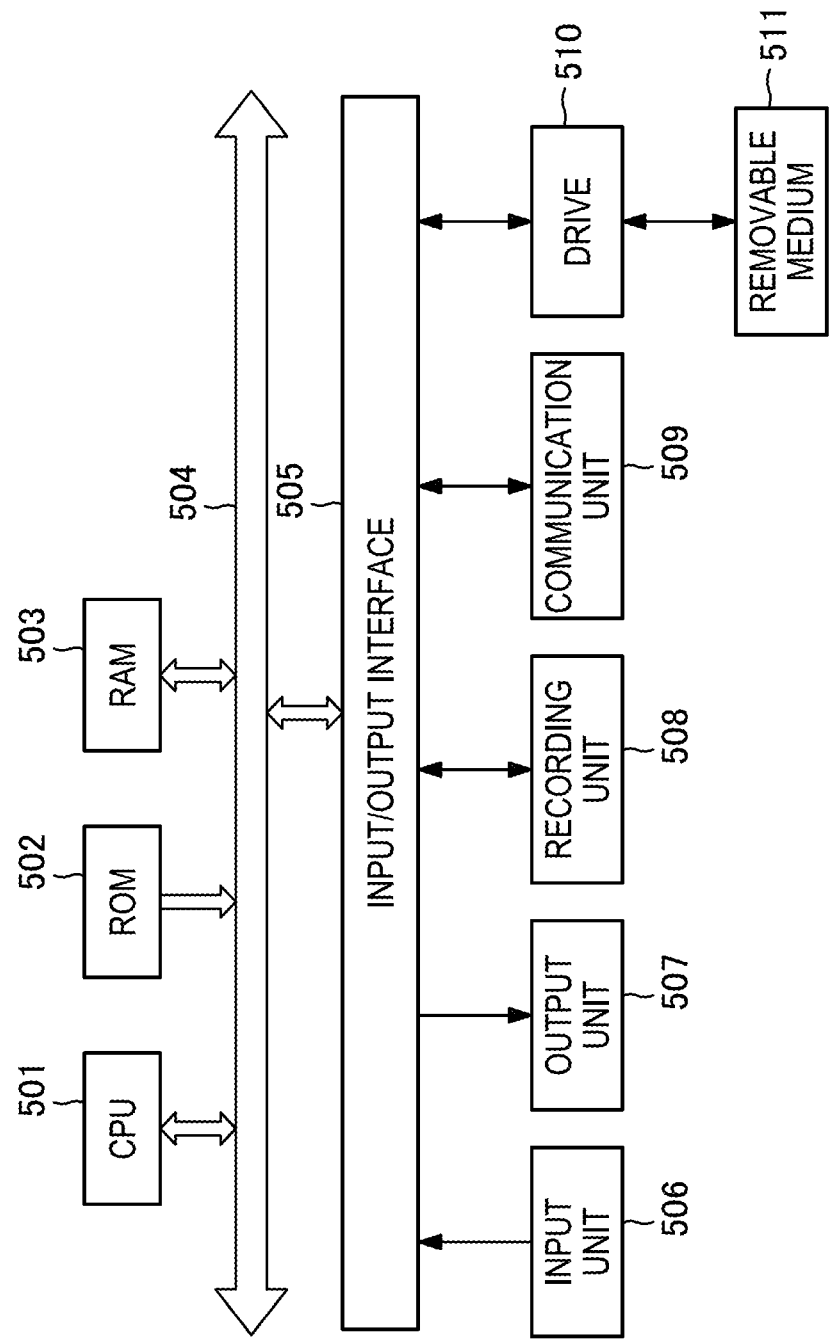
FIG. 21 is a diagram illustrating an example of the configuration of a computer.

FIG. 21 is a block diagram illustrating an example of a hardware configuration of a computer executing the above-described series of processes by a program.

In the computer, a central processing unit (CPU) 501, a read-only memory (ROM) 502, and a random access memory (RAM) 503 are connected to each other via a bus 504.

An input/output interface 505 is connected to the bus 504. An input unit 506 configured by a keyboard, a mouse, a microphone, or the like, an output unit 507 configured by a display, a speaker, or the like, a recording unit 508 configured by a hard disk, a non-volatile memory, or the like, a communication unit 509 configured by a network interface or the like, and a drive 510 driving a removable medium 511 such as a magnetic disk, an optical disc, a magneto-optical disk, or a semiconductor memory are connected to the input/output interface 505.

In the computer with the above-described configuration, the CPU 501 executes the above-described series of processes, for example, by loading and executing the program stored in the recording unit 508 on the RAM 503 via the input/output interface 505 and the bus 504.

For example, the program executed by the computer (the CPU 501) is recorded in the removable medium 511 as a package medium, such as a magnetic disk (including a flexible disk), an optical disc (including a compact disc-read only memory (CD-ROM) and a digital versatile disc (DVD)), a magneto-optical disc, or a semiconductor memory, for supply. Further, the program can be supplied via a wired or wireless transmission medium such as a local area network, the Internet, or digital satellite broadcast.

The program can be installed on the recording unit 508 via the input/output interface 505 by mounting the removable medium 511 on the drive 510. Further, the program can be received by the communication unit 509 via a wired or wireless transmission medium and can be installed on the recording unit 508. Further, the program can be installed in advance on the ROM 502 or the recording unit 508.

The program executed by the computer may be a program processed chronologically in the order described in the specification or a program processed in parallel or at a necessary timing when called.

Embodiments of the present technology are not limited to the above-described embodiments, but may be modified in various ways without departing from the spirit and scope of the present technology.

The present technology may be configured as follows.

[1] An image processing apparatus including:
a parallax map generation unit that generates a parallax map indicating a parallax of each pixel of a stereoscopic image based on right and left images forming the stereoscopic image;
a reliability calculation unit that generates a reliability map indicating reliability of the parallax map based on the right and left images;
a depth information estimation unit that generates a depth information map indicating a depth of a subject on the stereoscopic image based on one of the right and left images;
a depth parallax conversion unit that converts the depth information map into a pseudo-parallax map indicating a parallax corresponding to the depth; and
a parallax synthesis unit that synthesizes the parallax map and the pseudo-parallax map to generate a corrected parallax map based on the reliability map.

[2] The image processing apparatus according to [1], wherein the parallax synthesis unit generates the corrected parallax map by adding the parallax map and the pseudo-parallax map in a weighted manner using a weight determined by the reliability map.

[3] The image processing apparatus according to [1], wherein the parallax synthesis unit includes
a component synthesis unit that synthesizes a high-pass component of the pseudo-parallax map and a low-pass component of the parallax map to generate a synthesized map, and
an adding unit that synthesizes the parallax map and the synthesized map to generate the corrected parallax map based on the reliability map.

[4] The image processing apparatus according to [1], wherein the parallax synthesis unit includes
a component synthesis unit that synthesizes a low-pass component of the pseudo-parallax map and a high-pass component of the parallax map to generate a synthesized map, and
an adding unit that synthesizes the parallax map and the synthesized map to generate the corrected parallax map based on the reliability map.

[5] The image processing apparatus according to any one of [1] to [4], further comprising:
a residual map generation unit that generates a residual map indicating a residual between a region near a predetermined pixel of one of the right and left images and a region near a corresponding pixel of the other image which corresponds to the predetermined pixel,
wherein the reliability calculation unit generates the reliability map based on the residual map.

[6] The image processing apparatus according to any one of [1] to [4],
wherein the parallax map generation unit generates the parallax map by detecting, as a pixel corresponding to a predetermined pixel of one of the right and left images, a pixel of the other image for which a residual between a region near the predetermined pixel of the one image and a region near a pixel of the other image is minimum, and
wherein the image processing apparatus further comprises:
a peak sharpness map generation unit that generates a peak sharpness map that indicates sharpness of a peak of the residual of the pixels lined up in a predetermined direction on the other image and is used for generating the reliability map.

[7] The image processing apparatus according to any one of [1] to [4], further including:
a matching degree calculation unit that generates a matching degree map indicating a matching degree between a predetermined pixel of one of the right and left images and a first corresponding pixel of the other image corresponding to the predetermined pixel based on a detection result of the first corresponding pixel of the other image and a detection result of a second corresponding pixel of the one image corresponding to the first corresponding pixel of the other image,
wherein the reliability calculation unit generates the reliability map based on the matching degree map.

The present disclosure contains subject matter related to that disclosed in Japanese Priority Patent Application JP 2011-126403 filed in the Japan Patent Office on Jun. 6, 2011, the entire content of which is hereby incorporated by reference.

What is claimed is:

1. An image processing apparatus comprising:
a parallax map generation unit that generates a parallax map indicating a parallax of each pixel of a stereoscopic image based on right and left images forming the stereoscopic image;
a reliability calculation unit that generates a reliability map indicating reliability of the parallax map based on the right and left images;
a depth information estimation unit that generates a depth information map indicating a depth of a subject on the stereoscopic image based on one of the right and left images;
a depth parallax conversion unit that converts the depth information map into a pseudo-parallax map indicating a parallax corresponding to the depth; and
a parallax synthesis unit that synthesizes the parallax map and the pseudo-parallax map to generate a corrected parallax map based on the reliability map,
wherein the parallax map generation unit, the reliability calculation unit, the depth information estimation unit, the depth parallax conversion unit, and the parallax synthesis unit are each implemented via at least one processor.

2. The image processing apparatus according to claim 1, wherein the parallax synthesis unit generates the corrected parallax map by adding the parallax map and the pseudo-parallax map in a weighted manner using a weight determined by the reliability map.

3. The image processing apparatus according to claim 1, wherein the parallax synthesis unit includes
a component synthesis unit that synthesizes a high-pass component of the pseudo-parallax map and a low-pass component of the parallax map to generate a synthesized map, and
an adding unit that synthesizes the parallax map and the synthesized map to generate the corrected parallax map based on the reliability map,
wherein the component synthesis unit and the adding unit are each implemented via at least one processor.

4. The image processing apparatus according to claim 1, wherein the parallax synthesis unit includes
a component synthesis unit that synthesizes a low-pass component of the pseudo-parallax map and a high-pass component of the parallax map to generate a synthesized map, and
an adding unit that synthesizes the parallax map and the synthesized map to generate the corrected parallax map based on the reliability map,
wherein the component synthesis unit and the adding unit are each implemented via at least one processor.

5. The image processing apparatus according to claim 4, further comprising:
a residual map generation unit that generates a residual map indicating a residual between a region near a predetermined pixel of one of the right and left images and a region near a corresponding pixel of the other image which corresponds to the predetermined pixel,
wherein the reliability calculation unit generates the reliability map based on the residual map, and
wherein the residual map generation unit is implemented via at least one processor.

6. The image processing apparatus according to claim 4,
wherein the parallax map generation unit generates the parallax map by detecting, as a pixel corresponding to a predetermined pixel of one of the right and left images, a pixel of the other image for which a residual between a region near the predetermined pixel of the one image and a region near a pixel of the other image is minimum, and
wherein the image processing apparatus further comprises:
a peak sharpness map generation unit that generates a peak sharpness map that indicates sharpness of a peak of the residual of the pixels lined up in a predetermined direction on the other image and is used for generating the reliability map,
wherein the peak sharpness map generation unit is implemented via at least one processor.

7. The image processing apparatus according to claim 4, further comprising:
a matching degree calculation unit that generates a matching degree map indicating a matching degree between a predetermined pixel of one of the right and left images and a first corresponding pixel of the other image corresponding to the predetermined pixel based on a detection result of the first corresponding pixel of the other image and a detection result of a second corresponding pixel of the one image corresponding to the first corresponding pixel of the other image,
wherein the reliability calculation unit generates the reliability map based on the matching degree map, and
wherein the matching degree calculation unit is implemented via at least one processor.

8. An image processing method of an image processing apparatus, which includes a parallax map generation unit that generates a parallax map indicating a parallax of each pixel of a stereoscopic image based on right and left images forming the stereoscopic image, a reliability calculation unit that generates a reliability map indicating reliability of the parallax map based on the right and left images, a depth information estimation unit that generates a depth information map indicating a depth of a subject on the stereoscopic image based on one of the right and left images, a depth parallax conversion unit that converts the depth information map into a pseudo-parallax map indicating a parallax corresponding to the depth, and a parallax synthesis unit that synthesizes the parallax map and the pseudo-parallax map to generate a corrected parallax map based on the reliability map, the parallax map generation unit, the reliability calculation unit, the depth information estimation unit, the depth parallax conversion unit, and the parallax synthesis unit each being implemented via at least one processor, the image processing method comprising:

generating the parallax map by the parallax map generation unit;

generating the reliability map by the reliability calculation unit;

generating the depth information map by the depth information estimation unit;

generating the pseudo-parallax map by the depth parallax conversion unit; and generating the corrected parallax map by the parallax synthesis unit.

9. A non-transitory computer-readable medium having embodied thereon a program, which when executed by a computer causes the computer to execute a process including:

generating a parallax map indicating a parallax of each pixel of a stereoscopic image based on right and left images foaming the stereoscopic image;

generating a reliability map indicating reliability of the parallax map based on the right and left images;

generating a depth information map indicating a depth of a subject on the stereoscopic image based on one of the right and left images;

converting the depth information map into a pseudo-parallax map indicating a parallax corresponding to the depth; and synthesizing the parallax map and the pseudo-parallax map to generate a corrected parallax map based on the reliability map.

10. An image processing apparatus comprising:

a depth information estimation unit that generates a depth information map indicating a depth of a subject on a stereoscopic image based on one of right and left images forming the stereoscopic image;

a depth parallax conversion unit that converts the depth information map into a pseudo-parallax map indicating a parallax corresponding to the depth;

a parallax map generation unit that generates a parallax map indicating the parallax of each pixel of the stereoscopic image based on the right and left images and the pseudo-parallax map; and a parallax synthesis unit that synthesizes the parallax map and the pseudo-parallax map to generate a corrected parallax map based on a determined reliability of the parallax map generated by the parallax map generation unit, wherein the depth information estimation unit, the depth parallax conversion unit, the parallax map generation unit, and the parallax synthesis unit are each implemented via at least one processor.

11. An image processing method of an image processing apparatus, which includes a depth information estimation unit that generates a depth information map indicating a depth of a subject on a stereoscopic image based on one of right and left images forming the stereoscopic image, a depth parallax conversion unit that converts the depth information map into a pseudo-parallax map indicating a parallax corresponding to the depth, a parallax map generation unit that generates a parallax map indicating the parallax of each pixel of the stereoscopic image based on the right and left images and the pseudo-parallax map, and a parallax synthesis unit that synthesizes the parallax map and the pseudo-parallax map to generate a corrected parallax map based on a determined reliability of the parallax map generated by the parallax map generation unit, the depth information estimation unit, the depth parallax conversion unit, the parallax map generation unit, and the parallax synthesis unit each being implemented via at least one processor, the image processing method comprising:

generating the depth information map by the depth information estimation unit;

generating the pseudo-parallax map by the depth parallax conversion unit;

generating the parallax map by the parallax map generation unit; and generating the corrected parallax map by the parallax synthesis unit.

12. A non-transitory computer-readable medium having embodied thereon a program, which when executed by a computer causes the computer to execute a process comprising:

generating a depth information map indicating a depth of a subject on a stereoscopic image based on one of right and left images forming the stereoscopic image;

converting the depth information map into a pseudo-parallax map indicating a parallax corresponding to the depth;

generating a parallax map indicating the parallax of each pixel of the stereoscopic image based on the right and left images and the pseudo-parallax map; and synthesizing the parallax map and the pseudo-parallax map to generate a corrected parallax map based on a determined reliability of the generated parallax map.

* * * * *